United States Patent
Illsley et al.

(10) Patent No.: US 9,894,910 B2
(45) Date of Patent: Feb. 20, 2018

(54) BEVERAGE WHITENING COMPOSITION AND METHOD

(71) Applicant: A.C. DISPENSING EQUIPMENT, INC., Lower Sackville (CA)

(72) Inventors: Garth C. Illsley, Kentville (CA); Dennis P. Dickinson, Dartmouth (CA)

(73) Assignee: A.C. Dispensing Equipment, Inc., Lower Sackville (CA)

( * ) Notice: Subject to any disclaimer, the term of this patent is extended or adjusted under 35 U.S.C. 154(b) by 103 days.

(21) Appl. No.: 14/553,060

(22) Filed: Nov. 25, 2014

(65) Prior Publication Data

US 2015/0079264 A1    Mar. 19, 2015

Related U.S. Application Data

(63) Continuation-in-part of application No. 13/860,240, filed on Apr. 10, 2013, which is a continuation-in-part
(Continued)

(51) Int. Cl.
*A23C 11/02* (2006.01)
*A23C 9/15* (2006.01)
(Continued)

(52) U.S. Cl.
CPC ............ *A23C 11/02* (2013.01); *A23C 9/1516* (2013.01); *A23C 13/14* (2013.01); *A23L 1/19* (2013.01); *A23C 11/00* (2013.01); *A23V 2002/00* (2013.01)

(58) Field of Classification Search
CPC ....... A23C 11/02; A23C 9/1516; A23C 13/14; A23C 11/00; A23L 1/19
See application file for complete search history.

(56) References Cited

U.S. PATENT DOCUMENTS

| 2,738,279 A | 3/1956 | Stimpson et al. |
| 2,835,586 A * | 5/1958 | Peebles .................... A23C 9/16 23/313 AS |

(Continued)

FOREIGN PATENT DOCUMENTS

| EP | 0626136 | 11/1994 |
| EP | 0714609 | 6/1996 |

(Continued)

OTHER PUBLICATIONS

U.S. Appl. No. 13/860,240, Office Action dated Jul. 17, 2015.
(Continued)

*Primary Examiner* — Felicia C Turner
(74) *Attorney, Agent, or Firm* — Kathleen E. Marsman; Borden Ladner Gervais LLP

(57) ABSTRACT

A beverage whitening composition for whitening coffee, tea or hot chocolate, is described. The composition replaces a selected fluid, such as partially skimmed milk or half-and-half cream, in a reduced volume while providing the same or a very similar whitening ability and taste as the selected fluid to be replaced, so as to be indiscernible to the consumer. The target volume for reduction is 45% to 95%. The composition is useful for replacing skim, 1%, 2%, whole milk, light cream, half-and-half cream or coffee cream in dispensers containing bags, to reduce frequency of bag replacement. The composition may be steamed and used to whiten a steamed milk beverage, such as a latte.

12 Claims, 1 Drawing Sheet

Related U.S. Application Data of application No. 11/687,857, filed on Mar. 19, 2007, now Pat. No. 8,420,148.

(60) Provisional application No. 60/783,417, filed on Mar. 20, 2006.

(51) Int. Cl.
*A23C 13/14* (2006.01)
*A23L 1/19* (2006.01)
*A23C 11/00* (2006.01)

(56) References Cited

U.S. PATENT DOCUMENTS

| | | | |
|---|---|---|---|
| 2,933,393 | A | 4/1960 | Ortman |
| 3,108,875 | A | 10/1963 | Bell |
| 3,505,077 | A | 4/1970 | Bratland |
| 4,045,589 | A | 8/1977 | Petrowski et al. |
| 4,784,865 | A | 11/1988 | Baker et al. |
| 5,366,751 | A | 11/1994 | Pordy |
| 6,060,105 | A | 5/2000 | Meister et al. |
| 6,248,389 | B1 | 6/2001 | Biller et al. |
| 6,447,830 | B1 | 9/2002 | Cevallos et al. |
| 6,548,101 | B2 | 4/2003 | Cevallos et al. |
| 6,627,243 | B2 | 9/2003 | Cherian et al. |
| 6,761,285 | B2 | 7/2004 | Bertone |
| 6,824,810 | B2 | 11/2004 | Sargent et al. |
| 6,887,505 | B2 | 5/2005 | Reaves et al. |
| 8,420,148 | B2 | 4/2013 | Ilsley |
| 2003/0054079 | A1 | 3/2003 | Reaves et al. |
| 2005/0106305 | A1* | 5/2005 | Abraham .......... A23L 2/60 426/590 |
| 2005/0236429 | A1 | 10/2005 | Duck et al. |
| 2007/0248732 | A1 | 10/2007 | Miller |

FOREIGN PATENT DOCUMENTS

| | | |
|---|---|---|
| EP | 0864494 | 9/1998 |
| EP | 0660671 | 12/2000 |
| GB | 354535 | 8/1931 |
| GB | 1415844 | 11/1975 |

OTHER PUBLICATIONS

U.S. Appl. No. 13/860,240, Office Action dated Feb. 1, 2016.
Johnson, "Casein—How it colors cheese", Wisconsin Center for Dairy Research Dairy Pipeline, vol. 11, No. 2, Spring 1999, pp. 1-5.
Stiritz et al., "A Comparison of the Butterfat Content and Total Solids Content of Creams of Varying Richness Separated from the same sample of Milk", 1920 Journal of Dairy Science, vol. 3, No. 6, pp. 522-528.
McGee, "On Food and Cooking the Science and Lore of the Kitchen", 2004, 6 pages.
Phillips et al., "The Influence of Fat on the Sensory Properties, Viscosity and Color of Lowfat Milk", 1995 Journal of Dairy Science, vol. 78, No. 6, pp. 1258-1266.
Canadian Patent Application No. 2,582,130, Office Action dated Apr. 7, 2009.
U.S. Appl. No. 11/687,857, Notice of Allowance dated Dec. 20, 2012.
U.S. Appl. No. 13/860,240, Office Action dated Sep. 11, 2014.
U.S. Appl. No. 13/860,240, Office Action dated Mar. 6, 2015.
McNally, "Table for Blending Milk and Cream or Different Per Cents of Cream", Miller, Pyle, Graham Printers, Apr. 1, 1915, 32 pages.
"Dairy Goodness", https://web.archive.org/web/20100409175106/http://www.dairygoodness.ca/cream/types-of-cream/10-half-andhalf-or-blend-cream, Apr. 9, 2010, 1 page.
Non-Final Office Action dated Jul. 1, 2016 for U.S. Appl. No. 13/860,240, filed Apr. 10, 2013.

* cited by examiner

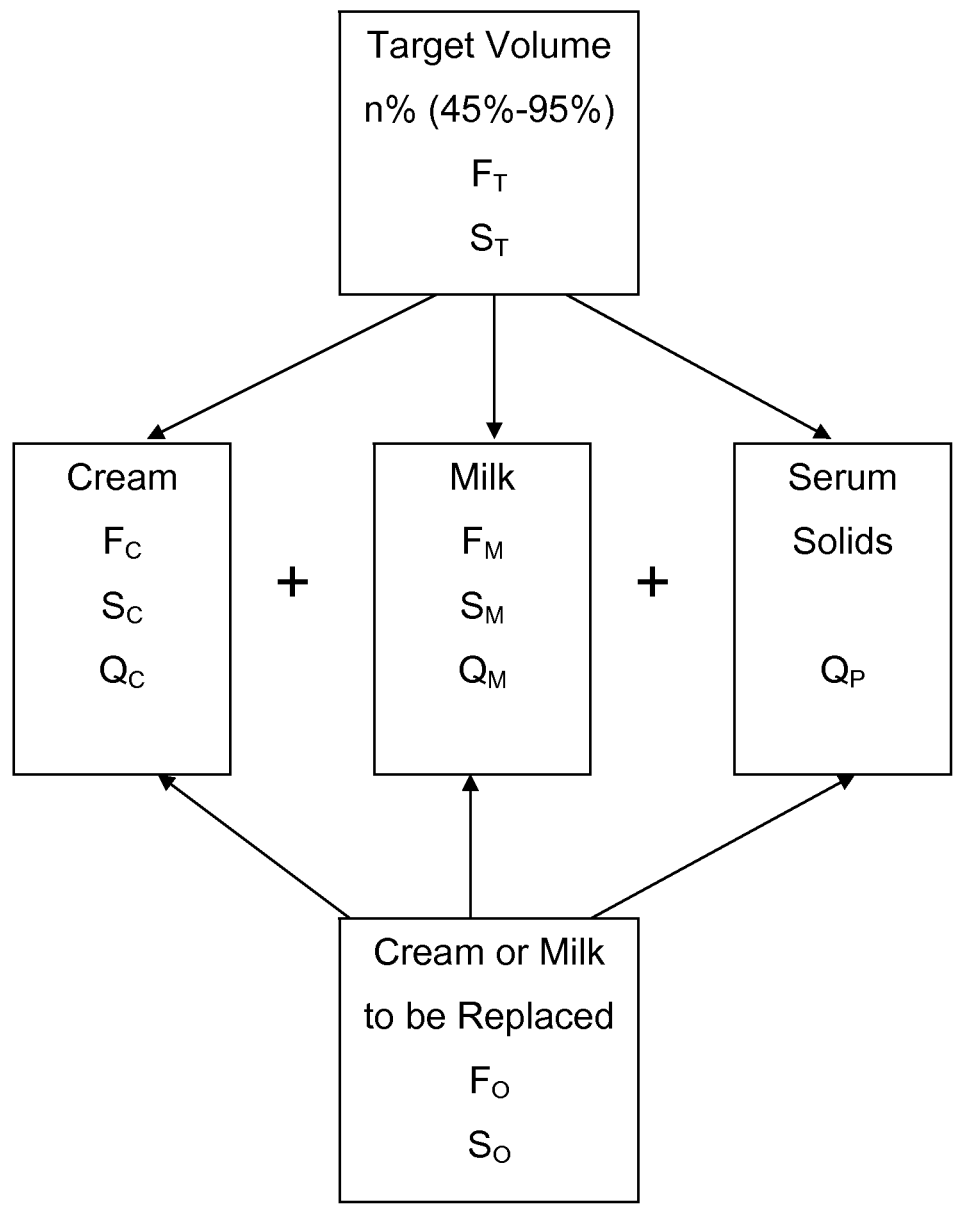

BEVERAGE WHITENING COMPOSITION AND METHOD

CROSS REFERENCE TO RELATED APPLICATIONS

This application is a Continuation-in-Part of and claims the benefit of and priority to U.S. patent application Ser. No. 13/860,240, filed Apr. 10, 2013, which is a Continuation-in-Part of and claims the benefit of and priority to U.S. patent application Ser. No. 11/687,857, filed Mar. 19, 2007, the entirety of each of which is incorporated by reference herein, and also claims the benefit of and priority to U.S. Provisional Patent Application No. 60/783,417, filed Mar. 20, 2006, the entirety of which is incorporated by reference herein.

FIELD

The present disclosure relates generally to a beverage whitening composition. More particularly, the present disclosure relates to a liquid composition including primarily milk-based ingredients for whitening hot beverages such as coffee or tea.

BACKGROUND

The most common method of whitening a beverage such as coffee or tea is to add cream or milk. Coffee shops that dispense large volumes of cream or milk may use dispensing equipment that contains large fluid volumes. One example of such dispensing equipment is described in applicant's co-pending U.S. patent application Ser. No. 10/830,033 published as U.S. Patent Application Publication No. 2005/0236429 A1, the entirety of which is herein incorporated by reference. Control of dispensing volume may be an available feature of the dispensing equipment, having the advantage of rendering a consistent product when a customer orders, for example, a whitened beverage with "double cream". A coffee shop using dispensing equipment will periodically need to replace the bags of cream or milk contained therein. Bag replacement frequency may be, for example, every 3 or 4 hours. This replacement frequency increases during the busiest times of the day, which can create delays in customer service.

Cream dispensed to whiten a beverage such as coffee typically contains 10% or 18% butter fat (b.f.). It is not optimal to consumer acceptance to simply substitute 20% or 35% b.f. cream, respectively, at half of the normally dispensed volume, because although the b.f. content is increased, the whitening effect attributable to non-fat milk solids is not achieved. A beverage so whitened is not as acceptable to the customer, and can clearly be distinguished from the 10% or 18% cream to which a customer may have grown accustomed.

Steamed milk is used for whitening in the preparation of specialty coffee drinks, such as cappuccinos and lattes. Further, tea-based beverages, such as Chai tea lattes or "milk tea" may be made with flavored or unflavored white, black, and green teas, or may be made with herbal teas, sometimes referred to as "tisane". Chocolate-based drinks, such as hot cocoa, fall within the category of steamed milk beverages. Such drinks can be prepared by heating the milk with steam, instead of direct heat or microwaves, because of the reduced likelihood of burning or scalding the milk.

Creating steamed milk requires the introduction of steam to the milk until a desired temperature is met, and/or until a desired amount of foam is created. Typically, refrigerator temperature (4-6° C.) milk is heated to about 140-160° C. The resulting steamed milk has a heated fluid portion and a foam portion, the ratio of which is controlled by such variables as the amount of air introduced by the steam wand. Steam contains water vapor, and thus introduces water into milk. At higher pressures, such as can be achieved with large commercial equipment, a low water volume is introduced during the steaming process. This only minimally increases fluid volume, for example from 2 to 10%. Smaller equipment, such as machines intended for home use, introduce steam into the milk with less pressure. Thus more steaming time is required to achieve the desired heating of the milk, and fluid volume may be increased to a greater extent, For example, a fluid increase of from 5 to 40% may occur to increase the temperature from 4-6° C. to about 140-160° C.

The greater the volume of water introduced into the milk in the steaming process, the more dilute the heated milk becomes. Such dilution decreases the whitening ability of the heated milk, and reduces the taste contribution of the milk to the final drink. A steaming process that introduces water and thereby increases the fluid milk volume by 2 to 40%, will have a decrease in whitening ability that is commensurate with the dilution from steaming.

It is estimated that the fluid volume of the original milk (excluding foam) can increase from 2% to 40%, depending on the steaming process parameters, such as the equipment, and the starting and ending temperatures. The dilution of milk due to the steaming process is undesirable to the consumer, and reduces the whitening ability of the milk in the resulting hot beverage, which may be a coffee, tea or chocolate-based beverage.

Beverage whitening products other than cream or milk are available, but rarely provide the same taste and organoleptic properties as cream or milk. Customers in a coffee shop who have become used to cream or milk would not find such substitutes acceptable. Condensed milk offers a highly viscous consistency, and is not easily dispensed or dispersed into a beverage. Powdered whitener formulations are not dispensable in a liquid form, and also require additional agitation to disperse properly into a beverage.

U.S. Pat. No. 6,887,505 (Reaves et al.) teaches a milk concentrate formed through ultra-high temperature pasteurization (UHT), intended for reconstitution into a milk beverage. The concentrate is formed by evaporating liquid from a fresh milk product, which requires labor-intensive processing. In general, conventional concentrated or condensed milk products are formed in this way, by a processing-intensive step involving removal of water. Prior to reconstitution, such concentrates would not be an acceptable addition to beverages such as coffee or tea.

U.S. Pat. No. 6,627,243 (Cherian et al.) describes a cream substitute containing butter, a thickening agent, and a food protein. The cream substitute is intended for cooked or baked food products normally requiring cream, such as sauces, soups or cream-filled pastries, and requires starch or gum as a thickening agent. European Patent EP 0 714 609 B1 describes whipping cream compositions with low fat content that are suitable for preparing whipped or frozen desserts. U.S. Pat. No. 6,248,389 (Biller et al.) describes a cream substitute for addition to food recipes that require cream. The substitute is provided in a non-liquid form, such as a cube, powder, or a semi-solid (extrudable) product. Such products as these are not appropriate as whiteners for beverages.

U.S. Pat. No. 4,045,589 (Petrowski et al.) provides a non-dairy fat emulsion suitable for whitening coffee. The emulsion includes a variety of non-milk solids that would impact the taste of coffee when compared with cream. U.S. Pat. No. 6,824,810 (Sargent et al.) describes a creamer composition that may be in either liquid or powdered form containing non-dairy ingredients that are microparticulated to specified dimensions so as to prevent aggregation of particles.

Others have attempted to provide concentrated coffee products to which water can be added. U.S. Pat. No. 6,447,830 and No. 6,548,101 (both to Cevallos et al.) describe a whitened coffee concentrate that includes milk solids as well as coffee solids, which can be constituted to an appropriate strength for consumption. Patent GB 1415844 describes a whitened coffee concentrate, including a coffee extract, to which water may be added to reconstitute a coffee beverage.

There is a need for a beverage whitening composition capable of achieving taste, whitening, and organoleptic properties similar to cream or milk when added to a beverage, when delivered to the beverage in a reduced volume.

SUMMARY

It is an object of the present disclosure to obviate or mitigate at least one disadvantage of previous beverage whitening compositions, or methods of whitening a beverage.

There is provided herein a beverage whitening composition for replacing a dairy fluid in a reduced amount, wherein:

the beverage to be whitened is coffee, tea, or hot chocolate;

the dairy fluid to be replaced is milk or cream having a butter fat content ($F_{FTBR}$) of from about 0.1% to about 20% wt/wt and a serum solids content ($S_{FTBR}$) of from about 5% to about 10% wt/wt; and the reduced amount is a target volume (TV) of from about 45% to about 95% of the fluid to be replaced;

said composition consisting of: (a) a water contributor selected from the group consisting of water, milk, cream, and combinations thereof; (b) a fat contributor selected from the group consisting of butter, anhydrous milk fat, milk, cream, and combinations thereof; (c) serum solids contributor; and (d) optionally a stabilizer;

wherein:
the total butter fat content of the composition ($F_T$) is:

$$F_T = \frac{F_{FTBR} \times 100}{TV};$$

and
the total serum solids content of the composition ($S_T$) is:

$$S_T = \frac{S_{FTBR} \times 100}{TV}.$$

There is also provided herein a method of formulating a beverage whitening composition for replacing a selected dairy fluid in a reduced amount, wherein the beverage to be whitened is coffee, tea, or hot chocolate; and the selected dairy fluid is a milk or a cream having a butter fat content ($F_{FTBR}$) of from about 0.1% to about 20% wt/wt and a serum solids content ($S_{FTBR}$) of from about 5% to about 10% wt/wt;

said method comprising:
determining the selected fluid to be replaced; and
forming, in the target volume (TV) of from about 45% to about 95% of the selected dairy fluid to be replaced, the composition consisting of: (a) a water contributor selected from the group consisting of water, milk, cream, and combinations thereof; (b) a fat contributor selected from the group consisting of butter, anhydrous milk fat, milk, cream, and combinations thereof; (c) serum solids; and (d) optionally a stabilizer;

wherein:
the total butter fat content of the composition ($F_T$) is:

$$F_T = \frac{F_{FTBR} \times 100}{TV};$$

and
the total serum solids content of the composition ($S_T$) is:

$$S_T = \frac{S_{FTBR} \times 100}{TV}.$$

Further, there is provided herein a method of whitening a beverage by replacing a selected dairy fluid to be replaced with a beverage whitening composition in a target volume (TV) of from about 45% to about 95% of the selected milk to be replaced, wherein the beverage is coffee, tea, or hot chocolate, and the dairy fluid to be replaced is milk or cream having a butter fat content ($F_{FTBR}$) of from about 0.1% to about 20% wt/wt and a serum solids content ($S_{FTBR}$) of from about 5% to about 10% wt/wt; said method comprising the step of adding the beverage whitening composition to the beverage, wherein the beverage whitening composition consists of: (a) a water contributor selected from the group consisting of water, milk, cream, and combinations thereof; (b) a fat contributor selected from the group consisting of butter, anhydrous milk fat, milk, cream, and combinations thereof; (c) serum solids; and (d) optionally a stabilizer;

wherein:
the total butter fat content of the composition ($F_T$) is:

$$F_T = \frac{F_{FTBR} \times 100}{TV};$$

and
the total serum solids content of the composition ($S_T$) is:

$$S_T = \frac{S_{FTBR} \times 100}{TV}.$$

There is additionally provided herein a beverage whitening composition for replacing a selected cream in a target volume of from 45-95% of the selected cream to be replaced, wherein the beverage to be whitened is coffee, tea, or hot chocolate; and the selected cream to be replaced has a butter fat content of from about 5% to about 20%, the composition consisting of: 10-80% by weight of cream having from 6-42% by weight butter fat; 15-87% by weight of milk having from 0.1-3.25% by weight butter fat; 0.5% to 13% serum solids; and optionally a stabilizer. The butter fat content of the composition is greater than the butter fat content of the selected cream to be replaced, and is calculated as:

[butter fat content of the selected cream]/[target volume];

and the serum solids content of the composition is greater than the serum solids content of the selected cream to be replaced, and is calculated as:

[serum solids content of the selected cream]/[target volume];

and the beverage whitening composition has the beverage whitening ability of the selected cream to be replaced when added to the beverage in the target volume compared with the selected cream to be replaced.

The compositions and methods described herein permit a variety of different recipes to be formulated in order to arrive at compositions having the same or similar nutrient compositions, despite being prepared from different ingredients.

Other aspects and features will become apparent to those ordinarily skilled in the art upon review of the following description of specific embodiments described in conjunction with the accompanying figures.

BRIEF DESCRIPTION OF THE DRAWINGS

Embodiments will now be described, by way of example only, with reference to the attached FIGURE.

FIG. 1 is a graphic depiction of parameters to be considered according to embodiment described herein.

DETAILED DESCRIPTION

Generally, there is provided herein a composition and method for whitening a beverage. The beverage to be whitened may be any drink that is served hot or cold to which cream or milk may be added. Examples of beverages to which cream or milk are traditionally added, and to which the instant composition may be added include coffee and tea. Cold or "iced" as well as hot beverages are encompassed by the categories of coffee and tea, and composition may be added to cold or "iced" beverages as well as to hot beverages. For example, "tea" includes hot tea and iced tea, and "coffee" encompasses hot or iced coffee, as well as specialty coffee beverages such as cappuccino, latte, and iced cappuccino.

Because of a variety of market influences, including supply and demand within the dairy industry and local government policies, different food ingredients such as milk-derived ingredients may be priced more economically than other ingredients on a weight basis. By formulating the instant compositions from the most economical ingredients, a manufacturer can respond to current trends in the market by adjusting the recipe used to arrive at the same or indiscernibly similar formulation. The compositions and methods described herein permit a wide variety of different recipes to be formulated in order to arrive at compositions for beverage whitening, which having the same or similar nutrient composition, despite being prepared from different components or ingredients.

As used herein, the term "component" refers to an ingredient used in or added to the composition. The term "component" may be used interchangeably with the term "ingredient". Both terms refer to discrete items or products which may be obtained for example from a supplier, a dairy, or another commercial source. Such products include but are not limited to different types of milks and creams, butter, water, skim milk powder, stabilizer, or flavor. Creams and milks may be described herein with an expressed reflecting a traditional name in the local dairy industry, or may be expressed according to a target butter fat level. Butter is referred to herein as a component or ingredient of a composition, although it is understood that butter itself has a water content, as it is not 100% butter fat, by weight when sold in the typical commercially available form. Skim milk powder may be considered as a component of the composition, while the term "serum solids" encompasses skim milk powder (as well as other sources) and may also be used to indicate an ingredient in a composition. The serum solids ingredient is typically skim milk powder, but may encompass a fluid component, such as found in skim milk or concentrated skim milk. Further, serum solids may be plant-derived protein sources. When water is added as a component to the composition, the amount of the water as a component in the recipe reflects the discrete addition of water, rather than the resulting (overall) water content as a nutrient of the composition, which would encompass water from all sources.

As used herein, the term "nutrient" is used to refer to individual parsable, measurable, or calculatable aspects of the final composition, or a measurable aspect of one of the individual ingredients which constitutes the composition. While it is understood that the term "nutrient" may imply a singular caloric source (such as the macronutrients: carbohydrate, fat, and protein) or alternatively the implication of a singular structure (such as the micronutrients: minerals and vitamins), herein the term is used specifically to refer to the following measurable aspects of the overall composition or of an individual ingredient: butter fat, water, serum solids, and stabilizer. Individual ingredients, as well as the composition containing multiple ingredients may be parsed into these measurable aspects or "nutrients". For purposes of the terminology used herein, these nutrients represent a measurable or calculatable unit of relevant analysis for the described compositions. Where flavoring, coloring, or other minor contributors to the weight of a composition are to be added, for example in an amount that will impact the weight of a composition by about 5%, or by less than about 5%, for example about 4%, about 3%, about 2%, about 1% or about 0.5% or less, the compositional analysis may be undertaken with or without the inclusion of such contributors.

Notably, water itself may be a component of the composition (when a set amount of water is added to a composition), and will also be a nutrient contained within the composition, or contained within other components (such as fluid milk). An illustration of this terminology is: if 100 g of a composition contains, inter alia, 10 g of water (as a discrete component or ingredient to be added) and 50 grams of fluid milk, then it can be said that water as component of the composition is 10% wt/wt. However, the water content as a nutrient within the overall composition, once formulated, will be higher because it includes not only the 10 g of added water, but also the water portion of the fluid milk ingredient (assume about 90% for the purposes of this illustration). Thus, water content when expressed as a nutrient will be at least 55% wt/wt of the composition, and possibly higher if the remaining components of the composition also contain water.

By allowing the user to select different formulations based on price and availability, the benefit to the manufacturer is that of cost-saving. A manufacturer can be responsive to market influences. For example when butter is in excess supply and is priced and sold at a more economically advantageous price per unit, as compared to a milk product containing a comparable amount of butter fat, the recipe for the formulations described herein may be adjusted to use more butter, while reducing the amount of milk or cream needed. Should skim milk powder become more economical and/or more practical (for reasons other than price) to use as compared with fluid milk, a manufacturer may adjust the recipe to increase the amount of skim milk powder used to displace fluid milk that may otherwise be used, and to compensate for any displaced fat content by adding butter, or a higher fat cream.

It is understood that formulations which may be formed using selective water removal, such as by reverse osmosis, are also encompassed herein if the total fat and total serum solids content correspond to the formulae described herein.

As used herein, the term "serum solids" refers to an ingredient, component, or nutrient of the compositions described herein, which comprises non-fat solids. Typically, the serum solids used are isolated from milk, but may also be isolated from non-milk sources. Examples of serum solids include skim milk powder, concentrated skim milk, isolated non-fat milk components such as milk protein including casein or whey isolates, modified milk solids, and whitening products that may be from plant-based (non-lacteal) sources such as from soy. Serum solids may refer to a component of the composition or to a nutrient contained within the composition, or within individual ingredients. Further, the serum solids component need not be free of liquid or water, and thus skim milk or concentrated skim milk may be used to provide the serum solids. The term "serum solids" bears no implication that a product has ever been dehydrated, re-hydrated, or reconstituted. The term "Total Serum Solids" may be used herein to define a serum solids as a nutrient derived from multiple ingredients of the composition.

Skim milk used in the compositions described herein may be from a source that is reconstituted skim milk powder.

The term "skim milk powder" will typically refer to a component or ingredient of the composition that is in a powder form which could be re-constituted to become skim milk with the addition of an appropriate amount of water. Fluid milk can be reconstituted from skim milk powder. Skim milk powder is an example of a type of serum solids, or a type of milk solid (non-fat).

The term "MSNF" stands for milk solids (non-fat), and is used herein to indicate serum solids derived from milk sources, but which do not contain fat (or contain negligible amounts of fat. Exemplary types of MSNF include skim milk powder, isolated milk protein, casein and/or whey.

The term "non-fat solids" may be used herein to describe solid components other than fat, contained within the compositions or ingredients described. Non-fat solids include MSNF, but also encompass plant-based solids, such as soy-based solids. When used generally to describe the total non-fat solids content of a given composition or a given component of the composition, "non-fat solids" may be the term used to indicate the quantity of solid components (other than fat) encompassed by all ingredients combined, or of an individual ingredient. For example, a fluid milk ingredient contains a specific percentage of water and a specific percentage of fat. The remaining components of such an ingredient is the "non-fat solids". Each individual ingredient of a composition may be parsed into components so as to estimate non-fat solids for the purposes of calculation, regardless of the fact that such an ingredient is not physically separated in this way when added to the composition.

The term "reduced-volume" refers to a reduction in the fluid volume of the beverage whitening composition versus the cream or milk to be replaced, such as conventional skim, partially skimmed, or whole milk. The volume may be reduced to a "target volume" that ranges from 45% to 95% of the cream or milk to be replaced, so that the volume of the beverage whitening composition needed to achieve the same whitening effect of 1 Liter of the cream or milk to be replaced is from 450 mL to 950 mL, and preferably from 60% to 85% (600 mL to 850 mL).

As described herein, a "target volume" is defined as a percentage of the volume of the cream or milk to be replaced. The target volume is a reduced volume compared to the amount of cream or milk to be replaced that is required to achieve the same whitening effect. For example, if the target volume for the composition is 80% of the volume of the milk to be replaced, this means that for a volume of 1000 mL of milk to be replaced, the comparable volume of beverage whitening composition as described herein would be 800 mL. The target volume of 80% results in a reduced volume of 800 mL, compared to the 1000 mL of milk that would have otherwise been required to achieve the same beverage whitening effect, or in order to achieve a beverage whitening effect that is indistinguishable to a consumer of a beverage so whitened.

Subjective or objective evaluation of the whitening ability of a composition may be undertaken based on evaluation of whitened samples of the composition versus a control. For example, a consumer (or panel of consumers) could be utilized to evaluate a whitened beverage based on visible qualities. Such a consumer or panel may also be utilized to evaluate consumer acceptance. If a consumer or consumer panel determines a composition to be indistinguishable from the cream or milk to be replaced, then it could be said that such a composition has the same whitening ability as the cream or milk it was designed to replace. Such an evaluation of acceptance may be undertaken on the basis of one or more parameters. While the visual effect of whitening is an important parameter, consumers can also evaluate the effect a beverage whitener has on the taste of a product, which encompasses other organoleptic properties such as the mouth feel of a product. Such organoleptic properties can be influenced by such factors as the density or fat content of a whitened beverage.

Evaluation of whitening effect can also be undertaken by comparing measurements or data collected on beverages whitened with the composition (test samples) versus those whitened using the cream or milk to be replaced (control sample). The Zahn cup measurement test, as described below in the Examples, can be utilized. Color matching can be done using standardized color chips. Colorimeter evaluation of color intensity using instrumentation such as the Vernier Colorimeter (Vernier Software & Technology of Beaverton, Oreg.) or other spectrophotometric technologies can be utilized to evaluate whether a composition has a comparable whitening ability to the cream or milk it is designed to replace.

Aside from target volume, most other quantitative amounts discussed herein are determined on a % wt/wt basis. For example, for butter fat content, or quantities of the nutrients or components (ingredients) that make up the composition, these are generally given on a % wt/wt basis, as indicated.

The term "b.f." is used herein to mean butter fat. The term "butter fat" is used herein to refer to the nutrient which is measurable and parsable as fat derived from milk sources, within the composition itself, or within any of the individual components or ingredients of the composition. "Milk fat" may be used synonymously with "butter fat". To illustrate this usage, it can be said that the butter fat content of 2% milk, as an ingredient, is 2 g butter fat per 100 g of the milk. The usage of this terminology can be further illustrated with respect to the terms "butter" and "butter fat" by considering that the nutrient composition of 100 g of butter (as an ingredient) is about 86 g butter fat, 13 g of water, and less than 1 g of serum solids.

As used herein the term "anhydrous milk fat" means butter fat or milk fat that is free of or very nearly free of water. Thus, the difference between the ingredient butter versus the ingredient anhydrous milk fat is the water content, which is about 13% of butter, and very close to 0% for anhydrous milk fat.

The term "beverage whitening ability" refers to the lightness of color of a beverage to be whitened using cream or milk. This parameter can be evaluated using visual inspection, for example by a human subject who may be planning on consuming the whitened beverage, or can be determined using instrumentation capable of measuring color-related parameters. Adequate similarity in beverage whitening ability, as would be understood by a person of skill in the art, is deemed to be a level that is either indistinguishable, or acceptably distinguishable to a consumer who may be planning on consuming the whitened beverage. For example, the ability for 18% b.f. cream to whiten a beverage is unacceptably distinguishable to such a consumer in whitening ability as compared with skim milk. A consumer wishing to consume a coffee beverage whitened to the level obtainable by cream would deem this difference to be unacceptably distinguishable.

Beverage whitening ability depends on both the butter fat content and the serum solids content. Thus, for example, if the butter fat content alone is doubled in a cream product, it cannot be used in half the volume to achieve the same beverage whitening ability as the original volume of cream to be replaced. In other words, 10 mL of 20% cream does not have the same beverage whitening ability as 20 mL of 10% cream. As a further example, if the serum solids content alone is doubled in a milk product, it cannot be used in half the volume to achieve the same beverage whitening ability as the original volume of milk to be replaced. In other words, 20 mL of milk will not have the same beverage whitening ability as 10 mL of milk which has been formulated to have double the serum solids volume. It was surprisingly found that both serum solids and fat content must be adjusted in order to achieve the same beverage whitening ability, as well as on careful experimentation to develop and optimize compositions able to achieve this objective.

In one embodiment, a beverage whitening composition is provided for replacing cream or milk in a reduced volume comprising: cream having a higher butter fat content than the cream or milk to be replaced; milk having a lower butter fat content than the cream or milk to be replaced; and serum solids. The composition has the beverage whitening ability of the cream or milk to be replaced in a target volume of from 30% to 95% of the volume of cream or milk to be replaced. In other words, a volume of from 300 mL to 950 mL of the composition, depending on the selected target volume, would have the beverage whitening ability of 1 Liter of the cream or milk to be replaced.

Replacing a selected milk in a reduced volume can be achieved, as described herein when the selected milk to be replaced is a conventional milk such as whole milk (3.25% b.f.), partially skimmed milk (for example 2% or 1% b.f.) or skim milk (0.1% b.f.), or alternatively with a less conventional type of milk having a butter fat content less than 5%. Conventional milks are typically produced by dairies without dilution, evaporation or re-constitution of the milk with water, and are thus referred to herein interchangeably as conventional milks or conventional milk products, or simply as "milk". When the term "milk" or "cream" is used herein without an adjective, it is generally used to describe a conventional milk or cream, such as one that is produced ubiquitously by dairies, and is widely commercially available. Conventional milk is typically the type of milk to which consumers have grown accustomed. The standard or conventional amounts of butter fat in such milks or creams are those which consumers are used to, and encompass a variety of butter fat percentages depending on consumer preference. Thus, when such milks are referred to herein as "the milk to be replaced" or "conventional milk", the distinguishing name of the product is typically employed as "whole milk", "partially skimmed 2% milk", "partially skimmed 1% milk", or "skim milk". In each case, a tailored composition can be prepared as described herein, so as to reduce the target volume to a desired, pre-determined level while still achieving the desired whitening ability when added to a hot beverage, such as coffee, tea, or a chocolate beverage like hot chocolate. It is primarily convention and consumer familiarity that determines the percentage of butter fat present in milk, and thus milk products contain different amounts of butter fat. However, a partially skimmed milk containing an alternative percentage, such as 1.5% butter fat, is also a type of milk that could be replaced in a reduced volume according to the inventive composition described herein. It is for convenience that the examples described herein primarily relate to a reduced volume composition for replacement of the 4 most popular and consumer-accepted milks: whole, partially skimmed 1%, 2%, and skim milk. It is to be understood that in different jurisdictions, whole milk may refer to a milk having a butter fat content other than 3.25%, such as 4% or 3.5%. While the term may have originated with reference to a milk that has not been partially skimmed yet, and then is considered to be "whole", the fat content of milk coming directly from the cow or other animal can vary depending on the individual animal and breed, as well as special conditions such as seasonal considerations.

When referred to herein, "cream" is meant to refer to fluid milk-based products having 5% butter fat or higher, up to and including very high fat creams such as those having about 45% fat or more. "Cream" may also be an appropriate name to apply to the compositions described herein.

Replacing a selected cream in a reduced volume can be achieved, as described herein when the selected cream to be replaced is a conventional cream such as half-and-half cream (10% b.f.), or coffee cream (18% b.f.). Conventional creams are typically produced by dairies without dilution, evaporation or re-constitution of the cream with water, and are thus referred to herein interchangeably as conventional creams or conventional cream products, or simply as "cream". Conventional cream is typically the type of cream to which consumers have grown accustomed according to individual preference. Thus, when such creams are referred to herein as "the cream to be replaced" or "conventional cream", the distinguishing name of the product is typically employed as "half-and-half cream", "light cream", or "coffee cream". In each case, a tailored composition, based on different recipes, can be prepared as described herein, so as to reduce the target volume to a desired, pre-determined level while still achieving the desired whitening ability when added to a hot beverage, such as coffee, tea, or a chocolate beverage like hot chocolate; or when added to a drink that is not served hot, such as iced coffee, iced tea or cold specialty coffee drinks. It is primarily convention and consumer familiarity that determines the percentage of butter fat present in cream. Thus cream products are available which contain different amounts of butter fat. However, an alternative cream product having a butter fat percentage that differs from conventional creams, such as 8% butter fat, or 12% butter fat is also a type of cream that could be replaced in a reduced volume according to the inventive composition described herein. It is for convenience that the examples described herein primarily relate to a reduced volume composition for replacement of the most popular and consumer-accepted creams: coffee cream, half-and-half cream, and light cream.

As used herein, the term "forming" with regard to the forming of a composition, means any acceptable mode of mixing or blending ingredients as can be utilized with a fluid dairy product.

When formulated, the composition contains from 105% (100/95) to 333% (100/30) wt/wt of the butter fat content of the cream or milk to be replaced. The butter fat content of the composition may be calculated as the inverse of the target volume.

Further, the total non-fat solids content of the composition may be from 105% (100/95) to 333% (100/30) wt/wt of the non-fat milk solids content of the cream or milk to be replaced. The total non-fat solids content of the composition may be calculated as the inverse of the target volume.

The butter fat content of the composition (as % wt/wt) may be calculated as $F_T=(F_C \times Q_C)+(F_M \times Q_M)$ wherein $F_C$ is the % wt/wt butter fat content of the cream, $Q_C$ is the % wt/wt of the composition attributable to cream, $F_M$ is the % wt/wt butter fat content of the milk, and $Q_M$ is the % wt/wt of the composition attributable to milk.

The total non-fat solids content of the composition may be calculated as $S_T=(S_C \times Q_C)+(S_M \times Q_M)+(Q_P)$ wherein $S_C$ is the % wt/wt non-fat milk solids content of the cream, $Q_C$ is the % wt/wt of the composition attributable to cream, $S_M$ is the % wt/wt non-fat milk solids content of the milk, $Q_M$ is the % wt/wt of the composition attributable to milk, and $Q_P$ is the % wt/wt of the composition attributable to serum solids.

Cream may comprise from 1 to 90% wt/wt of the composition, the cream component having from 5 to 40% wt/wt butter fat. Milk may comprise from 1 to 90% wt/wt of the composition, the milk component having from 0 to 4% wt/wt butter fat. Serum solids may comprise from 1 to 30% wt/wt of the composition.

An exemplary composition may have 30% wt/wt whole milk having 3.25% wt/wt butter fat, 67% wt/wt cream having 42% wt/wt butter fat, 2.7% wt/wt serum solids, and 0.3% wt/wt stabilizer. Further, another exemplary composition may have 28% wt/wt skim milk, 69% wt/wt cream having 42% wt/wt butter fat, 2.7% wt/wt serum solids, and 0.3% wt/wt stabilizer.

Skim Milk as the Milk to be Replaced.

When skim milk is the selected milk to be replaced, a relatively low content of butter fat must nevertheless be maintained in the composition. The whitening effect of skim milk can be attributable in part to serum solids, and thus, an increase in serum solids that is commensurate with the increase in the butter fat content of the composition (versus skim milk) may be used. However, the increase in serum solids may be proportionally less than the increase in butter fat.

When the selected milk to be replaced is skim milk having a butter fat content of 0.1% wt/wt, an exemplary composition may consist of 0.5-2.0% by weight of cream having 5% by weight butter fat; 88-97% by weight of milk having 0.1% by weight butter fat (skim milk); serum solids; and optionally a stabilizer. The serum solids may be added in an amount of from 1% to 10%, and preferably at a level of from 2% to 7%. In general, the larger the target volume is, the less of the serum solids is needed in the composition to emulate the whitening ability of skim milk.

A specific exemplary composition is a reduced-volume skim milk replacement composition. The composition comprises 94% skim milk (containing 0.1% wt/wt butter fat), 1% cream (containing 5% wt/wt butter fat), 4.7% wt/wt serum solids, and 0.3% wt/wt stabilizer. In this way, the reduced-volume skim milk replacement composition has the whitening effect of commercial skim milk in a target volume that is about ⅔ (67%) of the volume of the skim milk to be replaced.

This reduced-volume skim milk replacement composition comprises about 0.15% wt/wt butter fat (compared with conventional skim milk containing 0.1%) and 14% (wt/wt) serum solids. Specifically: 4.7 g serum solids/100 g of composition is contributed by direct addition of serum solids, 9.4 g serum solids/100 g of composition is contributed by the skim milk component, and 0.1 g serum solids/100 g of composition is contributed by the cream component. These values are based on skim milk comprising about 10% serum solids while cream containing 5% butter fat comprises about 9.5% serum solids. Thus, the target volume for this reduced-volume skim milk replacement composition is about 67%. Additional exemplary compositions are described below in the Examples.

Partially Skimmed Milk as the Milk to be Replaced.

When the selected milk to be replaced is partially skimmed milk, for example having a butter fat content of 1% wt/wt, the composition may consist of 5-25% by weight of cream having from 5-42% by weight butter fat (for example, from 5 to 18% butter fat); 70-95% by weight of milk having from 0.1-2% by weight butter fat; serum solids; and optionally a stabilizer. When the selected milk to be replaced is partially skimmed milk having a butter fat content of 2% wt/wt, the composition may consist of 3-70% by weight of cream having from 5-42% by weight butter fat (for example, from 5 to 35% butter fat); 55-95% by weight of milk having from 0.1-3.25% by weight butter fat; serum solids; and optionally a stabilizer. The serum solids may be added in an amount of from 1% to 10%, and preferably at a level of from 2% to 7%. In general, the greater the target volume (as a percentage), the less of the additional serum solids is needed in the composition to emulate the whitening ability of the selected milk to be replaced.

An exemplary composition is a reduced-volume partially skimmed 1% milk replacement composition, for replacement of conventional 1% butter fat milk in a target volume of 70%. Thus, 70 mL of this partially skimmed milk replacement composition possesses the whitening ability of 100 mL of conventional partially skimmed 1% milk. The composition comprises 82% skim milk (containing 0.1% wt/wt butter fat), 14% "half and half" cream (containing 10% wt/wt butter fat), 3.7% wt/wt serum solids, and 0.3% wt/wt stabilizer. In this way, this reduced-volume partially skimmed 1% milk replacement composition has the whitening effect of conventional partially skimmed 1% milk in a target volume that is about 70% of the volume of the milk to be replaced.

This reduced-volume partially skimmed 1% milk replacement composition comprises about 1.4% wt/wt butter fat (compared with conventional partially skimmed 1% milk containing 1%) and 13% (wt/wt) serum solids. Specifically:

3.7 g serum solids/100 g of composition is contributed by direct addition of serum solids, 8.2 g serum solids/100 g of composition is contributed by the skim milk component, and 1.2 g serum solids/100 g of composition is contributed by the cream component. These values are based on skim milk comprising about 10% serum solids while cream containing 10% butter fat comprises about 9% serum solids. Thus, the target volume for this reduced-volume partially skimmed 1% milk replacement composition is about 70%.

Another exemplary composition is a reduced-volume partially skimmed 2% milk replacement composition, for replacement of conventional 2% butter fat milk in a target volume of 55%. Thus, 55 mL of this partially skimmed 2% milk replacement composition possesses the whitening ability of 100 mL of conventional partially skimmed 2% milk. The composition comprises 77% partially skimmed 1% milk (containing 1% wt/wt butter fat), 16% "coffee cream" (containing 18% wt/wt butter fat), 6.7% wt/wt serum solids, and 0.3% wt/wt stabilizer. In this way, this reduced-volume partially skimmed 2% milk replacement composition has the whitening effect of conventional partially skimmed 2% milk in a target volume that is about 55% of the volume of the milk to be replaced.

This reduced-volume partially skimmed 2% milk replacement composition comprises about 3.6% wt/wt butter fat (compared with conventional partially skimmed 2% milk containing 2%) and 16% (wt/wt) serum solids. Specifically: 6.7 g serum solids/100 g of composition is contributed by direct addition of serum solids, 7.6 g serum solids/100 g of composition is contributed by the partially skimmed 1% milk component, and 1.3 g serum solids/100 g of composition is contributed by the cream component. These values are based on partially skimmed 1% milk comprising about 10% serum solids while cream containing 18% butter fat comprises about 8% serum solids. Thus, the target volume for this partially skimmed 2% milk replacement composition is about 55%.

Whole Milk as the Milk to be Replaced.

When the selected milk to be replaced is whole milk having a butter fat content of 3.25% wt/wt, the composition may consist of 3-80% by weight of cream having from 5-42% by weight butter fat; 15-95% by weight of milk having from 0.1-3.25% by weight butter fat; serum solids; and optionally a stabilizer. The serum solids may be added in an amount of from 1% to 10%, and preferably at a level of from 2% to 7%. In general, the greater the target volume (as a percentage), the less of the additional serum solids is needed in the composition to emulate the whitening ability of the selected milk to be replaced.

An exemplary composition is a reduced-volume whole milk replacement composition, for replacement of conventional whole milk comprising about 3.25% butter fat in a target volume of 65%. Thus, 65 mL of this whole milk replacement composition possesses the whitening ability of 100 mL of conventional whole milk. The composition comprises 76% partially skimmed 2% milk (containing 2% wt/wt butter fat), 19% "coffee cream" (containing 18% wt/wt butter fat), 4.7% wt/wt serum solids, and 0.3% wt/wt stabilizer. In this way, this reduced-volume whole milk replacement composition has the whitening effect of conventional whole milk in a target volume that is about 65% of the volume of the milk to be replaced.

This reduced-volume whole milk replacement composition comprises about 4.9% wt/wt butter fat (compared with conventional whole milk containing 3.25%) and 14% (wt/wt) serum solids. Specifically: 4.7 g serum solids/100 g of composition is contributed by direct addition of serum solids, 7.6 g serum solids/100 g of composition is contributed by the partially skimmed 2% milk component, and 1.5 g serum solids/100 g of composition is contributed by the cream component. These values are based on partially skimmed 2% milk comprising about 10% serum solids while cream containing 18% butter fat comprises about 8% serum solids. Thus, the target volume for this reduced-volume whole milk replacement composition is about 65%.

An exemplary target volume may be from 45% to 95%, and a more specific exemplary range for the target volume may be from 60 to 85% of the volume of cream or milk to be replaced. For example, an 18% wt/wt butter fat cream may be replaced in a target volume of 60% so that 600 mL of the instant composition can replace 1 Liter of the 18% cream and still maintain the beverage whitening ability.

There is also provided a method of whitening a beverage comprising adding to the beverage the inventive composition described herein. Such a beverage requires only the target volume of the inventive composition to be added to achieve the desired effect, which allows a reduced volume to be dispensed into the beverage, compared to using cream or milk.

There is also provided a method of formulating a beverage whitening composition for replacing cream or milk in a reduced volume comprising the step of combining cream having a higher butter fat content than the cream or milk to be replaced; and milk having a lower butter fat content than the cream or milk to be replaced; with serum solids, so that the composition has the beverage whitening ability of the cream or milk to be replaced in a target volume of from 30% to 95% of the volume of cream or milk to be replaced.

The following procedure may be followed in order to determine an optimal composition to meet the needs of any particular application. In order to formulate a composition that meets the needs of an end-user of the composition, the desired reduction in fluid volume should be considered, so that a "target volume" may be selected. For example, if a typical sized container of 10 L of a conventional milk has been in use previously, the end-user may wish to reduce this container to the somewhat smaller size of for example 8 L or 6 L for ease of handling by workers, or may instead wish to utilize the same size of container, but with the composition being contained therein instead of the conventional milk to be replaced, such a container could be used to dispense the whitening composition into additional beverages, thereby reducing the frequency with which the container needs replacing. For example, in the case of a target volume selected as 80%, the same size (10 L) container of the beverage whitening composition would whiten 25% more beverages than a 10 L container of the conventional milk to be replaced. In the case of a target volume selected as 60%, the same container of the beverage whitening composition would whiten 66% more beverages before needing to be replaced. Efficiencies and/or optimization in the workplace can lead to better service, for example in a typical busy coffee shop, as well as to cost savings.

In the event where automated equipment is used to dispense the composition into the beverage to be whitened, the set dispensing volume for the equipment could be reduced by an amount commensurate with the target volume. For example, if a coffee with "double milk" is ordered by a customer, and using conventional milk this would translate into the dispensing of 10 mL of milk into a 250 mL beverage, the use of the composition having an 80% target volume would allow the equipment to be adjusted to dispense 8 mL of the whitening composition (when the target volume of the composition is selected as 80%), as opposed to the 10 mL of conventional milk, while still maintaining consistent whitening of the beverage, so that the change from milk to the whitening composition is imperceptible to regular customers who frequent the establishment. Similarly, when the target volume of the composition is selected to be 60%, automated equipment could be adjusted to dispense 6 mL of the whitening composition for a whitening effect that is imperceptibly different to a consumer when compared with 10 mL of the conventional milk to be replaced.

In instances where the consumer adds her own milk to whiten a beverage, there are a number of advantages to using the beverage whitening composition. In many coffee shops, only small quantities of milk are left in an accessible concession area for a consumer to utilize. For example, while milk may be obtained by the establishment in large quantities, such as a 10 L container, a smaller carafe of 1 L or less may be utilized in the concession area where the customer adds sugar, sweetener, cream or milk. The consumer adds the milk (or cream) to which they have become accustomed, but the amount dispensed is not measured. Rather, the customer meters out the milk based primarily on visual whitening effect. There are rarely any measuring utensils available, and customers generally do not attempt to measure the fluid volume at a typical coffee shop concession area. The consumer typically pours in the milk directly from the carafe to her cup without the use of an intermediate measuring device, such as a spoon or measuring cup. As soon as the desired whitening effect is visibly determined as accomplished, the consumer ceases pouring. In such a case, the beverage whitening composition will achieve the desired visual whitening effect in a smaller volume than would be needed using the conventional milk to which the consumer has grown accustomed. Thus using primarily this visual cue, the consumer will voluntarily, albeit possibly unknowingly, use a smaller volume to achieve the same whitening effect.

This has the advantage of requiring less frequent replenishment of the milk or cream in the concession area.

The milk conventionally added to coffee or tea by the user at a concession area of a coffee shop is typically kept cold using an insulated carafe, by proximity to ice, or simply due to recent refrigerated storage. Thus the conventional temperature of the milk to be added may range from refrigeration temperature (4° C.) to ambient room temperature (20° C.), which is colder than the hot beverage to be whitened. Keeping the milk at a cold temperature is desirable to prevent spoilage or souring of the milk, if it is left out for longer periods of time during less busy times of day. Thus, the addition of a smaller volume of this whitening composition will have less impact on lowering the temperature of the beverage to be whitened.

When consumers are utilizing smaller volumes of such a compositions to achieve the same whitening effect, this means that such a carafe that is kept in a concession area would not require as frequent replacement. During busy times of day, the frequency with which the carafe must be replaced or re-filled increases, just as the staff of the establishment become busy with an increased customer volume. By filling the carafe with the beverage whitening composition, the customer will not require as much volume to achieve the same whitening effect as is accomplished with the conventional milk to which they have become accustomed.

Once a milk or cream to be replaced has been selected, the composition may be formulated according to the convenience and availability of ingredients. For higher fat compositions, more options are available for potential formulations. Specifically, if whole milk is selected as the milk to be replaced, the milk used in the composition may be skim, 1%, 2%, or even whole milk itself. The higher the fat content of the milk, however, the less of the fat content is required to come from cream. When a low fat milk is used in a composition formulated to replace whole milk, then a higher fat cream may be used in the formulation to achieve the right balance of fat in the composition itself, in order to satisfy the equation that calculates the butter fat content of the composition: [butter fat content of the selected milk]/[target volume].

The availability of cream and milk components, and cost considerations may be used in determining the optimal ingredients to be used in formulating the composition. For example, if skim milk is a particularly cost-effective ingredient on a volume basis, by comparison with 2% milk, for example, then a composition designed to replace whole milk (3.25% b.f.) in a target volume of 70% could be formulated to optimize the contribution of skim milk. A high fat cream could thus be selected, for example a 40% b.f. cream. Given these parameters, the beverage composition would need to be formulated to have a total fat content of about 4.6% (specifically calculated as 3.25% b.f.÷ 70%). When skim milk is used as the milk in the composition, 84.5% skim milk is used with 11.3% high fat cream (40% bf), 4% serum solids, and 0.2% stabilizer, for example. This results in a composition containing 4.6% butter fat, and which can achieve the same whitening effect as whole milk in about 70% of the volume of whole milk. Provided the butter fat content of the milk and cream are adequately selected to contribute to the total butter fat content desired in the composition, it does not matter which component (milk or cream) is the primary contributor to the total fat content of the composition.

In the event that skim milk is a not the most economical choice for formulating the composition, and whole milk was to be the most cost-effective or readily available type of milk, a composition could be formulated as follows to achieve the same result: whitening with the same effect as whole milk, but in 70% of the volume. The composition could be formulated with a lower fat cream, such as coffee cream at 18% b.f. An exemplary composition thus could be 86% whole milk, 9.8% coffee cream, 4% serum solids, and 0.2% stabilizer.

Further, if whole milk is a highly economical choice, and high fat cream (40% b.f.) is also a preferred choice of ingredients, a different formulation could be considered, such as: 92% whole milk, 3.5% high fat cream (40% b.f.), 4% serum solids, and 0.2% stabilizer.

To further illustrate the variety of formulations possible to achieve the same effect, a formulation prepared with skim milk and half-and-half (10% b.f.) cream could be formulated as follows: 50% skim milk, 45.8% half-and-half cream, 4% serum solids, and 0.2% stabilizer. This also results in a composition having 4.6% b.f., which achieves the same whitening effect as whole milk in 70% of the volume.

In each of the sample calculations, the composition fat content may be calculated as follows:

$$F_T = F_C \times Q_C + F_M \times Q_M.$$

In this calculation using skim milk and half-and-half cream, $F_C$=10%, $Q_C$=45.8% (or 0.458 L), $F_M$=0.1% and $Q_M$=50% (or 0.5 L). Thus, the total fat in 1 L of such a composition can be calculated as $F_T$=(10%×0.458 L)+ (0.1%×050 L)=4.63%, which is the same as the fat content of the milk to be replaced (3.25% for whole milk) divided by the target volume of 70% (or 0.7). This may be calculated as follows:

$$F_T = 3.25\% \div 0.70\% = 4.6\%.$$

Similarly, a variety of choices of ingredients are available for formulating other milk compositions, such as skim, or partially skimmed milks. Cream replacements may also be formulated in this way, so that the total fat content of the composition is calculated as:

Total fat of composition=[butter fat content of the selected cream]÷[target volume].

For example, the method of formulating such a composition may comprise combining from 1 to 90% wt/wt of the composition as cream; from 1 to 90% wt/wt of the composition as milk; and from 1 to 30% wt/wt of the composition as serum solids.

In one embodiment, a cream composition that includes a higher butter fat content and a higher total non-fat solids content (the sum of the "serum solids" plus non-fat solids from the milk and cream components) than the cream to be replaced is provided, thereby allowing a smaller volume to be dispensed into a cup of coffee in order to achieve the same whitening effect and the same butter fat content as 18% b.f. cream. Cream and milk provide the fluid, butter fat, and some of the serum solids content. Serum solids, such as MSNF, for example: skim milk powder, milk protein isolate, whey powder, or casein, provides the remaining total non-fat solids required.

Possible lacteal (milk-based) ingredients for formulating the composition include raw cream or "high fat cream" (at 41% b.f., 49.9% total solids); whipping cream or "heavy cream" (at 35% b.f.); table cream also referred to as "coffee cream" (at 18% b.f.); half-and-half (at 10% b.f.); light cream (5% b.f.); whole milk (3.25% b.f.); partially skimmed milk having 2% or 1% b.f., skim milk (0.1% b.f.), and MSNF, such as milk protein isolate, whey powder, casein, and skim milk powder. These ingredients are readily purchased but other creams or milks having different, un-conventional, percentages of butter fat may be used. Non-lacteal ingredients may be used in the serum solids component, such as soy-based non-fat solids.

A cream stabilizer may be added to the composition. Possible stabilizers include coffee cream stabilizer CC471 (Continental Custom Ingredients, Oakville, Canada), which includes sodium citrate, disodium phosphate, carrageenan, and dextrose; coffee cream stabilizer Germantown Salvo (Danisco, Scarborough, Canada), containing sodium citrate, sodium phosphate, carrageenan, locust bean gum, and dextrose; or food grade disodium phosphate, such as provided by Astaris (St. Louis, Mo.). A typical commercially available coffee cream may contain from 0.1 to 0.3% stabilizer by weight. The addition of stabilizers may depend on the jurisdiction in which the product is produced, and even by individual dairy. Coffee cream, for example, may be formulated with a stabilizer to keep it from "feathering" (producing oily globules) when it is poured into coffee. Cream can also be made more stable (and less likely to feather) by partial demineralization, or by addition of sodium caseinate which contributes to the serum solids content. Higher amounts of stabilizer may be present in the composition, for example, 0.4% or 0.5% stabilizer by weight.

In addition to being useful in reducing the volume of whitening composition versus milk used by a consumer as a minor addition (of less than 10% of the volume of the beverage to be whitened) to whiten coffee or tea, the beverage whitening compositions described herein are useful for the preparation of steamed milk for the addition in larger amounts (greater than 10% of the volume of the beverage to be whitened) to specialty coffee drinks, for example lattes. Steamed milk prepared using the reduced-volume beverage whitening compositions described herein results in hot, frothy milk that advantageously compensates, when added to whiten the coffee, tea, or chocolate beverage, for additional dilution due to input of water volume derived from steam. Thus a more flavorful beverage can be made when whitened with the composition described herein upon steaming.

FIG. 1 is a graphic depiction of parameters to be considered according to an embodiment described herein. A target volume is selected by the individual formulating the composition, based on need and requirements for a particular use, such as for adding milk or cream to coffee from an automatic dispenser in a high volume coffee shop. The target volume is expressed as a percentage "n %" of the 100% conventional milk or cream that the composition is to replace in a smaller volume. The target volume is selected as from 45% to 95% of the volume that would be required if conventional milk or cream was used. $F_T$ represents the total fat in the composition, once formulated, and $S_T$ represents the total serum solids present in the composition, once formulated, which are also determined based on the target volume and upon other factors, such as the selected milk or cream to be replaced. Total serum solids need not be identically scaled up to match the increase in total fat, but in general is also increased in the composition as compared with the milk (or cream) to be replaced.

The three components to be combined are shown here as cream, milk, and serum solids. Optionally, a stabilizer can be added as well. Each of the cream and milk components have a fat content $F_C$ and $F_M$, a serum solids component, $S_C$ and $S_M$ and a quantity or volume $Q_C$ and $Q_M$ that is determined by the individual formulating the composition to achieve a composition that emulates the whitening of the selected milk or cream to be replaced, but in a reduced volume (the target volume). The contribution of the serum solids component is determined and the quantity of serum solids to be added as a separate component to the composition is represented as $Q_P$. These three ingredients are added together to form the composition, to achieve the same whitening effect as the cream or milk to be replaced, which has a fat content of $F_O$ and a serum solids content of $S_O$. Typically, $F_O$ for milks to be replaced will be 0.1% (for skim milk), 1% or 2% for partially skimmed milks, and 3.25% for whole milk, but other less conventional, intermediate, values may be used which are lower than 5% butter fat (which is effectively considered as cream). The typical serum solids content of conventional milks to be replaced ($S_O$) may be, for example, 10%. For creams, the fat content of $F_O$ could range from 5% to 35%, and the conventional categories of light cream (5%), half-and-half cream (10%), coffee cream (18%), whipping cream or table cream (35%) are exemplary values. The serum solids content of such creams may range around 10%, but may be less when fat content increases. The depicted representation of FIG. 1 is provided to show the combination of the cream, milk, and serum solids ingredients in the composition, each of which contributes to total fat and/or total serum solids of the composition.

There are numerous combinations that can be prepared to formulate compositions according to the invention described herein. Each composition may be viewed in terms of ingredients per se or in terms of composition. Thus, it can be readily seen that different ingredients may be formulated to achieve the same composition. There can be numerous ways to prepare the same composition. For example, 1 kg of 2% b.f. milk (approximately a 1 liter volume) contains about 20 g of milk fat. To achieve the approximate amount of milk fat in the same unit weight, it is possible to substitute 200 g of 10% b.f. cream (contributing a total of 20 g milk fat) plus 800 g of skim milk (contributing a negligible amount of milk fat), and arrive at an equivalent composition as the 1 kg of 2% b.f. milk, but using different ingredients.

Similarly, skim milk powder may be used with an appropriately adjusted amount of water to achieve the desired composition. Thus, the skim milk powder need not only be used to provide serum solids, but it may also be used together with water in place of milk ingredients that already contain the expected amount of water. Milk ingredients can thus be replaced by skim milk powder and water, provided the resulting composition is consistent with compositions which fall within the selected parameters. Notably, the same composition may be achieved using different combinations of ingredients.

It should be understood that simply because an ingredient can be parsed into individual nutrients for analysis does not mean that the ingredient was formulated in this manner. For example, the whole milk which contains 3.25% butter fat does not mean that fat was added to this level. The observation of composition may be inherent in a naturally produced product (as in the case of whole milk which can be derived directly from a cow). However, skim milk may be prepared from a re-constituted powder of serum solids, or may be prepared by removing fat content from whole milk, and the two modes of preparing the skim milk can be considered herein to be equivalent in that both lead to the formation of the same ingredient.

Table 1 outlines typical nutrient values of different dairy fluids and other ingredients, which may be used in formulating the compositions described herein. Many of the ingredients shown are also typical beverage whitening compositions for coffee or tea, and thus represent the dairy fluid to be replaced (for example, 2% milk or half-and-half cream).

TABLE 1

Sample Composition of Typical Ingredients and/or Dairy Fluids to be Replaced

| Ingredient | Water | Butter Fat | Serum Solids | Stabilizer | Total |
|---|---|---|---|---|---|
| Skim Milk Powder | 0.5 g | 0 g | 99.5 g | 0 g | 100 g |
| Skim Milk | 91.6 g | 0 g | 8.4 g | 0 g | 100 g |
| 1% Milk | 90.7 g | 1 g | 8.3 g | 0 g | 100 g |
| 2% Milk | 89.8 g | 2 g | 8.2 g | 0 g | 100 g |
| Whole Milk (3.25% b.f.) | 88.7 g | 3.3 g | 8.0 g | 0 g | 100 g |
| Light Cream | 87.5 g | 5 g | 7.4 g | 0.1 g | 100 g |
| Half-and-Half Cream | 83.4 g | 10 g | 6.5 g | 0.1 g | 100 g |
| Coffee Cream | 76 g | 18 g | 5.8 g | 0.2 g | 100 g |
| Heavy Cream | 59.3 g | 35 g | 5.4 g | 0.3 g | 100 g |
| High Fat Cream | 53.9 g | 41 g | 4.8 g | 0.3 g | 100 g |
| Double Cream | 42.3 g | 54 g | 3.4 g | 0.3 g | 100 g |
| Water | 100 g | 0 g | 0 g | 0 g | 100 g |
| Butter | 13.3 g | 86 g | 0.7 g | 0 g | 100 g |
| Stabilizer | 0 g | 0 g | 0 g | 100 g | 100 g |

It is understood that the values shown in Table 1 are approximate and in some instances theoretical. For example, as used herein the term "high fat cream" may refer to 41% b.f., or alternatively 42% b.f. Different methods of assessment can yield different compositional results. Different tables and values are made available from different health authorities or dairy councils, and provide information pertaining to a set number of repetitions using an acceptable technique, but in few instances are compositional tables offered by different authorities an exact match. These values are provided here as discrete numbers (instead of ranges which would more appropriately encompass the inherent variability of different food products) for the purpose of allowing exemplary calculations below. Compositional values for various ingredients may vary based on location or country and the regulations in place with regard to dairy products (for example, the amount of stabilizer used in different cream products). Notably, the fat composition of fluid milk products referred to as "whole milk" can vary according to jurisdiction. Some jurisdictions may consider whole milk to be about 4% butter fat w/w, while others will use a lower amount, such as 3.25%. Either definition can be accommodated. The values in Table 1 should be viewed only as exemplary values for purposes of illustration only.

Further, the diets and type of animals, and the living conditions of the animals giving the milk may impact the composition of the ingredients. Other ingredients having a known composition that varies slightly from that shown in Table 1 can be readily accommodated using the adjusted values of the individual nutrient components of the ingredient. Note that the specific gravity of a milk or cream product will depend on the fat content as well as the serum solids content, because an increase in serum solids will increase density (specific gravity), while a higher fat content will decrease density because fat is lighter than water per unit weight. On the comparative basis that the specific gravity of water is 1 (weight per unit volume), it is known that the continuum of milks (from skimmed milk to whole milk) have a specific gravity of about 1.03, whereas 10% cream has a specific gravity of about 1, whipping cream about 0.96, and high fat cream about 0.94. For the most part, units reference herein are given per unit weight, but could similarly be calculated per unit volume. Please note that for fluid milk or cream, volume can be calculated by dividing the weight (g) by the specific gravity of the ingredient.

There is described herein a beverage whitening composition for replacing a dairy fluid in a reduced amount, wherein: the beverage to be whitened is coffee, tea, or hot chocolate; the dairy fluid to be replaced is milk or cream having a butter fat content ($F_{FTBR}$) of from about 0.1% to about 20% wt/wt and a serum solids content ($S_{FTBR}$) of from about 5% to about 10% wt/wt; and the reduced amount is a target volume (TV) of from about 45% to about 95% of the fluid to be replaced. The said composition consists of: (a) a water contributor selected from the group consisting of water, milk, cream, and combinations thereof; (b) a fat contributor selected from the group consisting of butter, anhydrous milk fat, milk, cream, and combinations thereof; (c) serum solids; and (d) optionally a stabilizer. The total butter fat content of the composition ($F_T$) can be calculated as:

$$F_T = \frac{F_{FTBR} \times 100}{TV} \quad \text{(Formula I)}$$

The total serum solids content of the composition ($S_T$) can be calculated as:

$$S_T = \frac{S_{FTBR} \times 100}{TV}. \quad \text{(Formula II)}$$

The selected fluid to be replaced is a dairy-based fluid such as skim milk, partially skimmed milk, whole milk, light cream, half-and-half cream or coffee cream.

An exemplary target volume may be from 60 to 85% of the fluid to be replaced.

When present, the stabilizer can be added in an amount of from about 0.2 to about 0.4% by weight, and it is assumed that certain components of the composition (such as cream, when used) may already include a stabilizer. Thus, the total content of stabilizer as a nutrient in the composition may exceed 0.4% by weight, when all sources are taken into consideration.

The water contributor is an ingredient of the composition that contains water. The water contributor may comprise water itself, milk, cream, or a combination of these. In some instances, when the water contributor is water itself, other components of the composition may have a low or negligible water content.

The fat contributor is an ingredient of the composition that contains fat. The fat contributor may be butter, anhydrous milk fat, milk, cream, and combinations thereof, provided there is a detectable amount of fat contained therein.

In some compositions, both the water contributor and the fat contributor are milk, which may encompass two different types of milk which have different fat contents. Certain compositions may consist of serum solids and milk. The stabilizer is not a necessary component of the composition, and it may be left out, especially when the fat content of the dairy fluid to be replaced is low, and thus the fat content of the composition is correspondingly low. Thus, the stabilizer is not required to prevent separation of the fat and aqueous components. Certain compositions may consist of serum solids, water, butter, and a stabilizer without containing any fluid milk. Other compositions encompassed herein may consist of serum solids, milk, butter, and a stabilizer.

A flavored or sweetened beverage whitening composition may be formed by adding a flavor or sweetener to the composition described herein. For example, some consumers enjoy a hazelnut flavored, chocolate flavored, toffee flavored or other types of flavored coffee. Instead of using flavored coffee beans, the whitening composition they add at the point of consumption may have the sweetener or flavor contained therein.

There is described herein a method of formulating a beverage whitening composition for replacing a selected dairy fluid in a reduced amount, wherein the beverage to be whitened is coffee, tea, or hot chocolate. The selected dairy fluid is a milk or a cream having a butter fat content ($F_{FTBR}$) of from about 0.1% to about 20% wt/wt and a serum solids content ($S_{FTBR}$) of from about 5% to about 10% wt/wt. The method comprises determining the selected fluid to be replaced; and forming, in the target volume (TV) of from about 45% to about 95% of the selected dairy fluid to be replaced. The composition formed is the one described herein, having (a) a water contributor; (b) a fat contributor; (c) serum solids; and (d) optionally a stabilizer. In the method described, the total butter fat content of the composition ($F_T$), calculated as:

$$F_T = \frac{F_{FTBR} \times 100}{TV}$$

and the total serum solids content of the composition ($S_T$), calculated as:

$$S_T = \frac{S_{FTBR} \times 100}{TV}$$

vary proportionally with the inverse of the target volume. Stated another way, the inverse of the target volume can be multiplied by the fat and serum solids content of the dairy fluid to be replaced in order to arrive at the total fat and the total serum solids content of the composition. For example, if the target volume is 70%, (or 70/100), the total butter fat and total serum solids content of the beverage whitening composition will be increased in the composition as compared with the selected fluid by the inverse of 70% or (100/70) which represents an increase of 1.43-fold. In such an exemplary instance of 10% b.f. (half-and-half cream), having 6.5% (wt/wt) serum solids, the composition would have 14.3% butter fat (calculated as: 10%*100/70) and 9.3% serum solids (calculated as: 6.5%*100/70).

There is described herein a method of whitening a beverage by replacing a selected dairy fluid to be replaced with a beverage whitening composition in a target volume (TV) of from about 45% to about 95% of the selected milk to be replaced, wherein the beverage is coffee, tea, or hot chocolate, and the dairy fluid to be replaced is milk or cream having a butter fat content ($F_{FTBR}$) of from about 0.1% to about 20% wt/wt and a serum solids content ($S_{FTBR}$) of from about 5% to about 10% wt/wt; said method comprising the step of adding the beverage whitening composition to the beverage, wherein the beverage whitening composition consists of: (a) a water contributor selected from the group consisting of water, milk, cream, and combinations thereof; (b) a fat contributor selected from the group consisting of butter, anhydrous milk fat, milk, cream, and combinations thereof; (c) serum solids; and (d) optionally a stabilizer. The total butter fat content of the composition ($F_T$) and the total serum solids content of the composition ($S_T$) can be calculated as described above.

Further, there is described herein a beverage whitening composition for replacing a selected cream in a target volume of from 45-95% of the selected cream to be replaced, wherein the beverage to be whitened is coffee, tea, or hot chocolate; and the selected cream to be replaced has a butter fat content of from about 5% to about 20%, the composition consisting of: 10-80% by weight of cream having from 6-42% by weight butter fat; 15-87% by weight of milk having from 0.1-3.25% by weight butter fat; 0.5% to 10% serum solids; and optionally a stabilizer. In this composition, the butter fat content of the composition is greater than the butter fat content of the selected cream to be replaced, and is calculated as: [butter fat content of the selected cream]/[target volume]. Further, the beverage whitening composition has the beverage whitening ability of the selected cream to be replaced when added to the beverage in the target volume compared with the selected cream to be replaced. Exemplary creams to be replaced include light cream, half-and-half cream, and coffee cream.

It is to be understood that the composition described need not contain milk or cream as an ingredient, provided there is a water source in the composition, which may be water. Further, butter may be used as the fat source, and as such no milk or cream component containing fat needs to be added to the composition. There are multiple ways to achieve the same nutrient content of the composition, or to attain comparable compositions that would be indistinguishable in nutrient composition and to the consumer in terms of the ability to whiten a beverage.

Example 1

Composition for Replacement of 18% b.f. Cream

A cream-based composition is provided which contains (% wt/wt): 30% whole milk (3.25% b.f.); 67% cream (42% b.f.); 2.7% skim milk powder; and 0.3% stabilizers. This composition is concentrated in both butter fat and serum solids, relative to the 18% cream to be replaced, and achieves a target volume of 60% of the 18% b.f. cream it is designed to replace. In other words, 600 mL of the composition will have the beverage whitening ability of 1 Liter of the 18% cream to be replaced. To state this in yet another way, the composition allows about a 40% reduction in the amount of cream dispensed, while achieving good consumer acceptance. A corresponding 40% reduction in the frequency of cream bag replacement in a cream dispenser is realized.

To prepare the composition, dry ingredients were pre-hydrated in approximately the equivalent quantity of whole milk using a lab-scale Silverson high-speed mixer at 5500 rpm for about 5 minutes total mixing time. Following this, the pre-hydrated ingredients were slowly added to the remaining ingredients in a 40 L milk can and mixed for approximately 5 minutes using a pilot-scale Silverson high-speed mixer. All heavy cream samples were processed on a Microthermics HTST/UHT unit by pre-heating to 60° C., and homogenized at 1500 PST (first stage), then at 500 PSI (second stage). The homogenized composition was then pasteurized at 80° C./30 seconds, and immediately cooled to approximately 14° C. Samples were packed into 10 L Schole™ bags and refrigerated.

The resulting product contained 28.92% b.f. A contribution of 12 g of this composition to an 8 oz cup of coffee resulted in 0.49 g protein, 1.28 g of total non-fat solids, and the coffee had a pH of 5.86. Relative to the control, consisting of 18 g of 18% b.f. table cream, the contributions were nearly identical, with 0.49 g protein, 1.25 g milk solids (non-fat) and a pH of 5.85.

The Zahn cup measurement test for coffee whitened according to this example resulted in a measurement of 21.9 sec at 3° C. The control measurement was 18.5 sec at 6° C. The color measurements for whitened coffee was 48.1 (L); 4.8 (a) and 20.3 (b), versus 52.7 (L); 4.2 (a) and 20.3 (b) for the control. Fat globule size in the whitened coffee was 1.93 µm using the composition; and 0.78 µm for the control, which was still deemed within the realm of consumer acceptability. The particle size distribution in terms of specific surface area (m$^2$/mL) was 7.57 for coffee whitened using the composition, versus 10.37 for the control. Overall, these values illustrate the acceptability of the inventive composition as a beverage whitener. The whitening ability is considered adequately similar in the composition versus control to achieve consumer acceptability.

To formulate 100 g of this composition the following ingredients may be combined: 30 g of whole milk, 67 g of high fat cream, 2.7 g of serum solids (skim milk powder), and 0.3 g of stabilizer. The resulting compositional analysis, based on the values shown above in Table 1 is a composition having the values shown in Table 1-A.

TABLE 1-A

Analysis of Initial Ingredients and Nutrients in Example 1 Composition

| Ingredient | Water (g) | Butter fat (g) | Serum solids (g) | Stabilizer (g) | Total |
|---|---|---|---|---|---|
| Whole milk (3.25% b.f) | 26.61 | 0.99 | 2.4 | 0 | 30 |
| High Fat Cream (41%) | 36.113 | 27.47 | 3.216 | 0.201 | 67 |
| Skim Milk Powder | 0.0135 | 0 | 2.6865 | 0 | 2.7 |
| Stabilizer | 0 | 0 | 0 | 0.3 | 0.3 |
| Totals | 62.7365 | 28.46 | 8.3025 | 0.501 | 100 |

Once the four ingredients of this composition are combined together, the origin of each ingredient is indistinguishable. That is to say, the butter fat content could have been derived from either cream, milk or even butter itself, but it cannot be resolved once mixing has taken place. Thus, this same composition may be formed from other ingredients to achieve the same outcome in terms of composition. An exemplary alternative composition is, for example: 5.9 g of skim milk powder, 28 g of 1% milk, 33 g water, 32.8 g butter and 0.3 g stabilizer. When the compositional analysis of these five ingredients is considered in view of the values provided in Table 1, a nearly identical compositional analysis results, as exhibited in Table 1-B.

TABLE 1-B

Analysis of Alternative Ingredients for Example 1

| Ingredient (or "component") | Water (g) | Butter fat (g) | Serum solids (g) | Stabilizer (g) | Total |
|---|---|---|---|---|---|
| Skim Milk Powder | 0.0295 | 0 | 5.8705 | 0 | 5.9 |
| 1% Milk | 25.396 | 0.28 | 2.324 | 0 | 28 |
| Water | 33 | 0 | 0 | 0 | 33 |
| Butter | 4.3624 | 28.208 | 0.2296 | 0 | 32.8 |
| Stabilizer | 0 | 0 | 0 | 0.3 | 0.3 |
| Totals | 62.7879 | 28.488 | 8.4241 | 0.3 | 100 |

When comparison is made between the ingredients of Table 1-A and Table 1-B, it is clear to see that the same composition may be prepared using different ingredients as long as it is formulated to have the same nutrient content once mixed.

Example 2

Composition for Replacement of 18% b.f. Cream

A cream-based composition is provided which contains (% wt/wt): 28% skim milk; 69% cream (42% b.f.); 2.7% skim milk powder; and 0.3% stabilizers. This composition is concentrated in both butter fat and total non-fat solids. The target volume for the composition is about 60% of the original volume of 18% b.f. cream. This allows about a 40% reduction in the amount of cream dispensed, while providing good consumer acceptance.

To prepare the composition, dry ingredients were pre-hydrated in approximately the equivalent quantity of skim milk using a lab-scale Silverson high-speed mixer at 5500 rpm for about 5 minutes total mixing time. Following this, the pre-hydrated ingredients were slowly added to the remaining ingredients in a 40 L milk can and mixed for approximately 5 minutes using a pilot-scale Silverson high-speed mixer. All heavy cream samples were processed on a Microthermics HTST/UHT unit by pre-heating to 60° C., and homogenized at 1500 PST (first stage), then at 500 PSI (second stage). The homogenized composition was then pasteurized at 80° C./30 seconds, and immediately cooled to approximately 14° C. Samples were packed into 10 L Schole™ bags and refrigerated.

The resulting product contained 28.92% b.f., and a contribution of 12 g of this composition to an 8 oz cup of coffee resulted in 0.49 g protein, 1.29 g of total non-fat solids, and the resulting whitened coffee had a pH of 5.86. Relative to the control, consisting of 18 g of 18% table cream, the contributions were nearly identical, with 0.49 g protein, 1.25 g milk solids (non-fat) and a pH of 5.85.

To formulate 100 g of this composition the following ingredients may be combined: 28 g skim milk, 69 g high fat cream, 2.7 g of added serum solids (skim milk powder), and 0.3 g of stabilizer. The resulting compositional analysis, based on the values shown above in Table 1 is a composition having the values shown in Table 2-A.

TABLE 2-A

Analysis of Initial Ingredients in Example 2 Composition

| | Water (g) | Butter fat (g) | Serum solids (g) | Stabilizer (g) | Total |
|---|---|---|---|---|---|
| Skim milk (0.1% b.f) | 25.648 | 0 | 2.352 | 0 | 28 |
| High Fat Cream (41% b.f.) | 37.191 | 28.29 | 3.312 | 0.207 | 69 |
| Skim Milk Powder | 0.0135 | 0 | 2.6865 | 0 | 2.7 |
| Stabilizer | 0 | 0 | 0 | 0.3 | 0.3 |
| Totals | 62.8525 | 28.29 | 8.3505 | 0.507 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) as a "nutrient" cannot be traced back to individual components once the composition is formed, except in theory. Thus, this composition may be formed from other ingredients to achieve the same outcome in terms of overall nutrient content of the composition. An exemplary alternative composition is, for example: 8.2 g of skim milk powder, 58.4 g water, 33 g butter and 0.4 g stabilizer. When the compositional analysis of these ingredients is considered in view of the values provided in Table 1, a nearly identical compositional analysis results, as exhibited in Table 2B.

TABLE 2-B

Analysis of Alternative Ingredients for Example 2

| | Water (g) | Butter fat (g) | Serum solids (g) | Stabilizer (g) | Total |
|---|---|---|---|---|---|
| Skim Milk Powder | 0.041 | 0 | 8.159 | 0 | 8.2 |
| Water | 58.4 | 0 | 0 | 0 | 58.4 |

TABLE 2-B-continued

Analysis of Alternative Ingredients for Example 2

| | Water (g) | Butter fat (g) | Serum solids (g) | Stabilizer (g) | Total |
|---|---|---|---|---|---|
| Butter | 4.389 | 28.38 | 0.231 | 0 | 33 |
| Stabilizer | 0 | 0 | 0 | 0.4 | 0.4 |
| Totals | 62.83 | 28.38 | 8.39 | 0.4 | 100 |

When comparison is made between the ingredients of Table 2-A and Table 2-B, it is clear to see that the same composition may be prepared using different ingredients as long as it is formulated to have the same nutrient content, or a very similar nutrient content, once mixed.

The Zahn cup measurement test for coffee whitened according to this example resulted in a measurement of 23.4 sec at 3° C. The control measurement was 18.5 sec at 6° C. The color measurements for whitened coffee was 46.4 (L); 5.4 (a) and 20.5 (b), versus 52.7 (L); 4.2 (a) and 20.3 (b) for the control. Fat globule size in the test whitened coffee was 1.61 μm using the composition; and 0.78 μm for the control, which was deemed within the realm of consumer acceptability. The particle size distribution in terms of specific surface area ($m^2$/mL) was 7.47 for coffee whitened using the test composition, versus 10.37 for the control. Overall, these values illustrate the acceptability of the inventive composition as a beverage whitener. The whitening ability of the test composition was deemed to be adequate to replace 18% b.f. cream with good consumer acceptance.

Example 3

Composition for Replacement of Whole Milk in 75% of the Volume

A milk-based reduced-volume composition is provided which contains (% wt/wt): 54% skim milk (0.1 b.f.); 42% half and half cream (10% b.f.); 3.7% skim milk powder; and 0.3% stabilizers. This composition is concentrated in both butter fat and serum solids, relative to the whole milk to be replaced, and achieves the same whitening in a target volume of 75% of the whole milk it is designed to replace. In other words, 750 mL of the composition will have the beverage whitening ability of 1 Liter of the 3.25% b.f. whole milk to be replaced. To state this in yet another way, the composition allows about a 25% reduction in the amount of milk dispensed, while achieving good consumer acceptance. A corresponding 25% reduction in the frequency of milk bag replacement in a milk dispenser is realized. The milk based compositions are useful for the preparation of steamed milk for the addition to specialty coffee drinks, for example lattes. Steamed milk prepared using this reduced-volume composition results in hot, frothy milk that does not dilute the coffee, tea, or chocolate beverage due to increases in water volume upon steam input.

To prepare the composition, dry ingredients are pre-hydrated in approximately the equivalent quantity of whole milk using a lab-scale Silverson high-speed mixer at 5500 rpm for about 5 minutes total mixing time. Following this, the pre-hydrated ingredients are slowly added to the remaining ingredients in a 40 L milk can and mixed for approximately 5 minutes using a pilot-scale Silverson high-speed mixer. All heavy cream samples may be processed on a Microthermics HTST/UHT unit by pre-heating to 60° C., and homogenized at 1500 PST (first stage), then at 500 PSI (second stage). The homogenized composition can then be pasteurized at 80° C./30 seconds, and immediately cooled to approximately 14° C. Samples can be packed into 10 L Schole™ bags and refrigerated.

The resulting composition contains 4.25% b.f. and a total of 13% serum solids (from all ingredients), as compared with conventional whole milk to be replaced, which contains 3.25% b.f., and about 10% serum solids.

To formulate 100 g of this composition the following ingredients may be combined: 54 g skim milk, 42 g of half-and-half cream (10% b.f.), 3.7 g of serum solids (skim milk powder), and 0.3 g of stabilizer. The resulting compositional analysis, based on the values shown above in Table 1 is a composition having the values shown in Table 3-A.

TABLE 3-A

Analysis of Initial Ingredients in Example 3 Composition

|  | Water (g) | Butter fat (g) | Serum solids (g) | Stabilizer (g) | Total |
|---|---|---|---|---|---|
| Skim milk (0.1% b.f) | 49.464 | 0 | 4.536 | 0 | 54 |
| Half-and-Half Cream | 35.028 | 4.2 | 2.73 | 0.042 | 42 |
| Skim Milk Powder | 0.0185 | 0 | 3.6815 | 0 | 3.7 |
| Stabilizer | 0 | 0 | 0 | 0.3 | 0.3 |
| Totals | 84.5105 | 4.2 | 10.9475 | 0.342 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 11 g of skim milk powder, 83.7 g water, 5 g butter and 0.3 g stabilizer. When the compositional analysis of these ingredients is considered in view of the values provided in Table 1, a nearly identical compositional analysis results, as exhibited in Table 3-B.

TABLE 3-B

Analysis of Alternative Ingredients for Example 3.

|  | Water (g) | Butter fat (g) | Serum solids (g) | Stabilizer (g) | Total |
|---|---|---|---|---|---|
| Skim Milk Powder | 0.055 | 0 | 10.945 | 0 | 11 |
| Water | 83.7 | 0 | 0 | 0 | 83.7 |
| Butter | 0.665 | 4.3 | 0.035 | 0 | 5 |
| Stabilizer | 0 | 0 | 0 | 0.3 | 0.3 |
| Totals | 84.42 | 4.3 | 10.98 | 0.3 | 100 |

When comparison is made between the ingredients of Table 3-A and Table 3-B, it is clear to see that the same composition may be prepared using different ingredients as long as it is formulated to have the same or a similar nutrient content once mixed.

Example 4

Composition for Replacement of Whole Milk in 65% of the Volume

A composition is provided which contains (% wt/wt): 68% skim milk (0.1% b.f.); 27% coffee cream (18% b.f.); 4.7% skim milk powder; and 0.3% stabilizers. This composition is concentrated in both butter fat and serum solids, relative to the whole milk to be replaced, and achieves the same whitening effect as whole milk in a target volume of 65% of the conventional whole milk it is designed to replace. In other words, 650 mL of the composition will have the beverage whitening ability of 1 Liter of the 3.25% milk to be replaced. To state this in yet another way, the composition allows about a 35% reduction in the amount of milk dispensed, while achieving good consumer acceptance. A corresponding 35% reduction in the frequency of milk bag replacement in a milk dispenser is realized.

The composition is prepared according to the method described above in Examples 1-3. The resulting composition contains about 5% b.f. and a total of about 14% serum solids (from all ingredients).

To formulate 100 g of this composition the following ingredients may be combined: 68 g skim milk, 27% coffee cream, 4.7 g of serum solids (skim milk powder), and 0.3 g of stabilizer. The resulting compositional analysis, based on the values shown above in Table 1 is a composition having the values shown in Table 4-A.

TABLE 4-A

Analysis of Initial Ingredients in Example 4 Composition

|  | Water (g) | Butter fat (g) | Serum solids (g) | Stabilizer (g) | Total |
|---|---|---|---|---|---|
| Skim milk (0.1% b.f) | 62.288 | 0 | 5.712 | 0 | 68 |
| Coffee Cream (18% b.f.) | 20.52 | 4.86 | 1.566 | 0.054 | 27 |
| Skim Milk Powder | 0.0235 | 0 | 4.6765 | 0 | 4.7 |
| Stabilizer | 0 | 0 | 0 | 0.3 | 0.3 |
| Totals | 82.8315 | 4.86 | 11.9545 | 0.354 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 11.4 g of skim milk powder, 11.8 g of high fat cream, 76.5 g water, and 0.3 g stabilizer. When the compositional analysis of these ingredients is considered in view of the values provided in Table 1, a nearly identical compositional analysis results, as exhibited in Table 4-B.

TABLE 4-B

Analysis of Alternative Ingredients for Example 4

| | Water (g) | Butter fat (g) | Serum solids (g) | Stabilizer (g) | Total |
|---|---|---|---|---|---|
| Skim Milk Powder | 0.057 | 0 | 11.343 | 0 | 11.4 |
| Water | 76.5 | 0 | 0 | 0 | 76.5 |
| High Fat Cream | 6.3602 | 4.838 | 0.5664 | 0.0354 | 11.8 |
| Stabilizer | 0 | 0 | 0 | 0.3 | 0.3 |
| Totals | 82.9172 | 4.838 | 11.9094 | 0.3354 | 100 |

When comparison is made between the ingredients of Table 4-A and Table 4-B, it is clear to see that the same composition may be prepared using different ingredients as long as it is formulated to have the same nutrient content, or a very similar nutrient content that is indistinguishable to the typical consumer, once mixed.

Example 5

Composition for Replacement of Whole Milk in 65% of the Volume

An additional exemplary composition is a reduced-volume whole milk replacement composition, for replacement of conventional whole milk comprising about 3.25% butter fat in a target volume of 65%. Thus, 65 mL of this whole milk replacement composition possesses the whitening ability of 100 mL of conventional whole milk. The composition comprises 76% partially skimmed 2% milk (containing 2% wt/wt butter fat), 19% "coffee cream" (containing 18% wt/wt butter fat), 4.7% wt/wt serum solids, and 0.3% wt/wt stabilizer. In this way, this reduced-volume whole milk replacement composition has the whitening effect of conventional whole milk in a target volume that is about 65% of the volume of the milk to be replaced.

This reduced-volume whole milk replacement composition comprises about 4.9% wt/wt butter fat (compared with conventional whole milk containing 3.25%) and 14% (wt/wt) serum solids. Specifically: 4.7 g serum solids/100 g of composition is contributed by direct addition of serum solids, 7.6 g serum solids/100 g of composition is contributed by the partially skimmed 2% milk component, and 1.5 g serum solids/100 g of composition is contributed by the cream component. These values are based on partially skimmed 2% milk comprising about 10% serum solids while cream containing 18% butter fat comprises about 8% serum solids. Thus, the target volume for this reduced-volume whole milk replacement composition is about 65%.

To formulate 100 g of this composition the following ingredients may be combined: 76 g of partially skimmed (2% b.f.) milk, 19 g coffee cream (18% b.f.), 4.7 g of serum solids (skim milk powder), and 0.3 g of stabilizer. The resulting compositional analysis, based on the values shown above in Table 1 is a composition having the values shown in Table 5-A.

TABLE 5-A

Analysis of Initial Ingredients in Example 5 Composition

| | Water (g) | Butter fat (g) | Serum solids (g) | Stabilizer (g) | Total |
|---|---|---|---|---|---|
| Partially Skimmed milk (2% b.f) | 68.248 | 1.52 | 6.232 | 0 | 76 |
| Coffee Cream | 14.44 | 3.42 | 1.102 | 0.038 | 19 |
| Skim Milk Powder | 0.0235 | 0 | 4.6765 | 0 | 4.7 |
| Stabilizer | 0 | 0 | 0 | 0.3 | 0.3 |
| Totals | 82.7115 | 4.94 | 12.0105 | 0.338 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 4.5 g of skim milk powder, 89.5 g of skim milk, 5.7 g butter and 0.3 g stabilizer. When the compositional analysis of these ingredients is considered in view of the values provided in Table 1, a nearly identical compositional analysis results, as exhibited in Table 5-B.

TABLE 5-B

Analysis of Alternative Ingredients for Example 5

| Component | Nutrient | | | | |
|---|---|---|---|---|---|
| | Water (g) | Butter fat (g) | Serum solids (g) | Stabilizer (g) | Total |
| Skim Milk Powder | 0.0225 | 0 | 4.4775 | 0 | 4.5 |
| Skim milk | 81.982 | 0 | 7.518 | 0 | 89.5 |
| Butter | 0.7581 | 4.902 | 0.0399 | 0 | 5.7 |
| Stabilizer | 0 | 0 | 0 | 0.3 | 0.3 |
| Totals | 82.7626 | 4.902 | 12.0354 | 0.3 | 100 |

When comparison is made between the ingredients of Table 5-A and Table 5-B, it is clear to see that the same composition may be prepared using different ingredients as long as it is formulated to have the same, or a very similar, nutrient content once mixed.

Example 6

Composition for Replacement of Partially Skimmed 2% Milk in 80% of the Volume

A composition is formulated to contain (% wt/wt) 84% skim milk (containing 0.1% wt/wt butter fat), 13.1% coffee cream (containing 18% wt/wt butter fat), 2.7% wt/wt serum solids, and 0.2% wt/wt stabilizer. In this way, the reduced-volume partially skimmed 2% milk replacement composition has the whitening effect of commercial 2% milk in a target volume of 80% of the volume of the partially skimmed 2% milk to be replaced.

This reduced-volume partially skimmed 2% milk replacement composition comprises about 2.4% wt/wt butter fat (compared with conventional partially skimmed milk containing 2%) and 12.1% (wt/wt) serum solids. Specifically: 2.7 g serum solids/100 g of composition is contributed by direct addition of serum solids, 8.4 g serum solids/100 g of composition is contributed by the skim milk component, and 1.07 g serum solids/100 g of composition is contributed by the cream component. Thus, the target volume for this reduced-volume partially skimmed 2% milk replacement composition is 80%.

To formulate 100 g of this composition the following ingredients may be combined: 84 g of skim milk, 13.1 g of coffee cream, 2.7 g of serum solids (skim milk powder in particular), and 0.2 g of stabilizer. The resulting compositional analysis, based on the values shown above in Table 1 is a composition having the values shown in Table 6-A.

TABLE 6-A

Compositional analysis of Example 6 based on Table 1 Values

|  | Water (g) | butter fat (g) | serum solids (g) | Stabilizer (g) | Total (g) |
| --- | --- | --- | --- | --- | --- |
| 2% milk | 75.432 | 1.68 | 6.888 | 0 | 84 |
| Coffee cream (18% b.f.) | 9.956 | 2.358 | 0.7598 | 0.0262 | 13.1 |
| Skim Milk Powder | 0.0135 | 0 | 2.6865 | 0 | 2.7 |
| Stabilizer | 0 | 0 | 0 | 0.2 | 0.2 |
| Totals: | 85.4015 | 4.038 | 10.3343 | 0.2262 | 100 |

Once the four ingredients of this composition are combined together, the origins of each ingredient is indistinguishable. That is to say, the butter fat content could have been derived from either cream, milk or even butter itself, but it cannot be resolved once mixing has taken place. Thus, this same composition may be formed from other ingredients to achieve the same outcome in terms of composition. An exemplary alternative composition is, for example: 9.8 g of skim milk powder, 11.5 g of heavy cream (35% b.f.), 78.5 g water, and 0.2 g stabilizer. When the compositional analysis of these four ingredients is considered in view of the values provided in Table 1, a nearly identical compositional analysis results, as exhibited in Table 6-B.

TABLE 6-B

Analysis of Alternative Ingredients for Example 6

|  | Water (g) | butter fat (g) | serum solids (g) | Stabilizer (g) | Total (g) |
| --- | --- | --- | --- | --- | --- |
| Skim milk Powder | 0.049 | 0 | 9.751 | 0 | 9.8 |
| Heavy cream (35% b.f.) | 6.8195 | 4.025 | 0.6325 | 0.023 | 11.5 |
| Water | 78.5 | 0 | 0 | 0 | 78.5 |
| Stabilizer | 0 | 0 | 0 | 0.2 | 0.2 |
| Totals | 85.3685 | 4.025 | 10.3835 | 0.223 | 100 |

When comparison is made between the ingredients of Table 6-A and Table 6-B, it is clear to see that the same composition may be prepared using different ingredients as long as it is formulated to have the same nutrient content once mixed.

Example 7

Composition for Replacement of Partially Skimmed 2% Milk in 60% of the Volume

A composition is provided which contains (% wt/wt): 67% light cream (5.0% b.f.); 28% skim milk (0.1% b.f.); 4.7% skim milk powder; and 0.3% stabilizers. This composition is concentrated in both butter fat and serum solids, relative to the partially skimmed 2% milk to be replaced, and achieves the same whitening effect as partially skimmed 2% milk in a target volume of 60% of the milk it is designed to replace. In other words, 600 mL of the composition will have the beverage whitening ability of 1 Liter of the partially skimmed 2% milk to be replaced. To state this in yet another way, the composition allows about a 40% reduction in the amount of milk dispensed, while achieving good consumer acceptance. A corresponding 40% reduction in the frequency of milk bag replacement in a milk dispenser is realized.

The composition is prepared according to the method described above in Examples 1-3. The resulting composition contains about 3.3% b.f. and a total of about 16% serum solids (from all ingredients).

To formulate 100 g of this composition the following ingredients may be combined: 67 g light cream (5% b.f.), 28 g skim milk, 4.7 g of serum solids (skim milk powder), and 0.3 g of stabilizer. The resulting compositional analysis, based on the values shown above in Table 1 is a composition having the values shown in Table 7-A.

TABLE 7-A

Analysis of Initial Ingredients in Example 7 Composition

|  | Water (g) | Butter fat (g) | Serum solids (g) | Stabilizer (g) | Total |
| --- | --- | --- | --- | --- | --- |
| Skim milk | 25.648 | 0 | 2.352 | 0 | 28 |
| Light Cream (5%) | 58.625 | 3.35 | 4.958 | 0.067 | 67 |
| Skim Milk Powder | 0.0235 | 0 | 4.6765 | 0 | 4.7 |
| Stabilizer | 0 | 0 | 0 | 0.3 | 0.3 |
| Totals | 84.2965 | 3.35 | 11.9865 | 0.367 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 3.9 g of skim milk powder, 91.8 g of skim milk, 4 g butter and 0.3 g stabilizer. When the compositional analysis of these ingredients is considered in view of the values provided in Table 1, a nearly identical compositional analysis results, as exhibited in Table 7-B.

TABLE 7-B

Analysis of Alternative Ingredients for Example 7

|  | Water (g) | Butter fat (g) | Serum solids (g) | Stabilizer (g) | Total |
|---|---|---|---|---|---|
| Skim Milk Powder | 0.0195 | 0 | 3.8805 | 0 | 3.9 |
| Skim milk | 84.0888 | 0 | 7.7112 | 0 | 91.8 |
| Butter | 0.532 | 3.44 | 0.028 | 0 | 4 |
| Stabilizer | 0 | 0 | 0 | 0.3 | 0.3 |
| Totals | 84.6403 | 3.44 | 11.6197 | 0.3 | 100 |

When comparison is made between the ingredients of Table 7-A and Table 7-B, it is clear to see that the same composition may be prepared using different ingredients as long as it is formulated to have the same nutrient content once mixed.

Example 8

Composition for Replacement of Partially Skimmed 2% Milk in 55% of the Volume

An exemplary composition is provided as a reduced-volume partially skimmed 2% milk replacement composition, for replacement of conventional 2% butter fat milk in a target volume of 55%. Thus, 55 mL of this partially skimmed 2% milk replacement composition possesses the whitening ability of 100 mL of conventional partially skimmed 2% milk. The composition comprises 77% partially skimmed 1% milk (containing 1% wt/wt butter fat), 16% "coffee cream" (containing 18% wt/wt butter fat), 6.7% wt/wt serum solids, and 0.3% wt/wt stabilizer. In this way, this reduced-volume partially skimmed 2% milk replacement composition has the whitening effect of conventional partially skimmed 2% milk in a target volume that is about 55% of the volume of the milk to be replaced.

This reduced-volume partially skimmed 2% milk replacement composition comprises about 3.6% wt/wt butter fat (compared with conventional partially skimmed 2% milk containing 2%) and 16% (wt/wt) serum solids. Specifically: 6.7 g serum solids/100 g of composition is contributed by direct addition of serum solids, 7.6 g serum solids/100 g of composition is contributed by the partially skimmed 1% milk component, and 1.3 g serum solids/100 g of composition is contributed by the cream component. These values are based on partially skimmed 1% milk comprising about 10% serum solids while cream containing 18% butter fat comprises about 8% serum solids. Thus, the target volume for this partially skimmed 2% milk replacement composition is about 55%.

To formulate 100 g of this composition the following ingredients may be combined: 77 g of partially skimmed (1% b.f.) milk, 16 g of coffee cream (18% b.f.), 6.7 g of serum solids (skim milk powder), and 0.3 g of stabilizer. The resulting compositional analysis, based on the values shown above in Table 1 is a composition having the values shown in Table 8-A.

TABLE 8-A

Analysis of Initial Ingredients in Example 8 Composition

|  | Water (g) | Butter fat (g) | Serum solids (g) | Stabilizer (g) | Total |
|---|---|---|---|---|---|
| 1% milk | 69.839 | 0.77 | 6.391 | 0 | 77 |
| Coffee Cream (18%) | 12.16 | 2.88 | 0.928 | 0.032 | 16 |
| Powdered Skim Milk | 0.0335 | 0 | 6.6665 | 0 | 6.7 |
| Stabilizer | 0 | 0 | 0 | 0.3 | 0.3 |
| Totals | 82.0325 | 3.65 | 13.9855 | 0.332 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 13.9 g of skim milk powder, 81.5 g of water, 4.3 g butter and 0.3 g stabilizer. When the compositional analysis of these ingredients is considered in view of the values provided in Table 1, a nearly identical compositional analysis results, as exhibited in Table 8-B.

TABLE 8-B

Analysis of Alternative Ingredients for Example 8

|  | Water (g) | Butter fat (g) | Serum solids (g) | Stabilizer (g) | Total |
|---|---|---|---|---|---|
| Powdered Skim Milk | 0.0695 | 0 | 13.8305 | 0 | 13.9 |
| Water | 81.5 | 0 | 0 | 0 | 81.5 |
| Butter | 0.5719 | 3.698 | 0.0301 | 0 | 4.3 |
| Stabilizer | 0 | 0 | 0 | 0.3 | 0.3 |
| Totals | 82.1414 | 3.698 | 13.8606 | 0.3 | 100 |

When comparison is made between the ingredients of Table 8-A and Table 8-B, it is clear to see that the same composition may be prepared using different ingredients as long as it is formulated to have the same nutrient content once mixed.

Example 9

Composition for Replacement of Partially Skimmed 1% Milk in 70% of the Volume

Another exemplary composition is a reduced-volume partially skimmed 1% milk replacement composition, for replacement of conventional 1% butter fat milk in a target volume of 70%. Thus, 70 g of this partially skimmed milk replacement composition possesses the whitening ability of 100 g of conventional partially skimmed 1% milk. The composition comprises 82% skim milk (containing 0.1% wt/wt butter fat), 14% "half and half" cream (containing 10% wt/wt butter fat), 3.7% wt/wt serum solids, and 0.3% wt/wt stabilizer. In this way, this reduced-volume partially skimmed 1% milk replacement composition has the whitening effect of conventional partially skimmed 1% milk in a target volume that is about 70% of the volume of the milk to be replaced.

This reduced-volume partially skimmed 1% milk replacement composition comprises about 1.4% wt/wt butter fat (compared with conventional partially skimmed 1% milk containing 1%) and 13% (wt/wt) serum solids. Specifically: 3.7 g serum solids/100 g of composition is contributed by direct addition of serum solids, 8.2 g serum solids/100 g of composition is contributed by the skim milk component, and 1.2 g serum solids/100 g of composition is contributed by the cream component. These values are based on skim milk comprising about 10% serum solids while cream containing 10% butter fat comprises about 9% serum solids. Thus, the target volume for this reduced-volume partially skimmed 1% milk replacement composition is about 70%.

To formulate 100 g of this composition the following ingredients may be combined: 82 g skim milk, 14 g half-and-half cream, 3.7 g of serum solids (skim milk powder), and 0.3 g of stabilizer. The resulting compositional analysis, based on the values shown above in Table 1 is a composition having the values shown in Table 9-A.

TABLE 9-A

Analysis of Initial Ingredients in Example 9 Composition

|  | Water (g) | Butter fat (g) | Serum solids (g) | Stabilizer (g) | Total |
|---|---|---|---|---|---|
| Skim Milk | 75.112 | 0 | 6.888 | 0 | 82 |
| Half-and-half | 11.676 | 1.4 | 0.91 | 0.014 | 14 |
| Powdered Skim Milk | 0.0185 | 0 | 3.6815 | 0 | 3.7 |
| Stabilizer | 0 | 0 | 0 | 0.3 | 0.3 |
| Totals | 86.8065 | 1.4 | 11.4795 | 0.314 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 3.8 g of skim milk powder, 52.8 g of skim milk, and 43.4 g whole milk. Because a stabilizer is optional, in formulations with lower amounts of butter fat (for example, compositions meant for replacement of a milk instead of a cream), the stabilizer need not be added. When the compositional analysis of these ingredients is considered in view of the values provided in Table 1, a nearly identical compositional analysis results, as exhibited in Table 9-B.

TABLE 9-B

Analysis of Alternative Ingredients for Example 9

|  | Water (g) | Butter fat (g) | Serum solids (g) | Stabilizer (g) | Total |
|---|---|---|---|---|---|
| Powdered Skim Milk | 0.019 | 0 | 3.781 | 0 | 3.8 |
| Skim Milk | 48.3648 | 0 | 4.4352 | 0 | 52.8 |
| Whole Milk | 38.4958 | 1.4322 | 3.472 | 0 | 43.4 |
| Totals | 86.8796 | 1.4322 | 11.6882 | 0 | 100 |

When comparison is made between the ingredients of Table 9-A and Table 9-B, it is clear to see that the same composition may be prepared using different ingredients as long as it is formulated to have the same nutrient content once mixed.

Notably, this milk replacement consists of only three ingredients: powdered skim milk, skim milk (fluid), and whole milk (3.25% b.f.), but yet is used as a replacement for partially skimmed (1% b.f.) milk in a 70% volume. The water content and the fat content are supplied by the milk components of the composition, whereas the serum solids are supplied by each of the three ingredients. When formulated in this manner based on the target volume of 70%, and the calculations shown herein, there is no need to add water or butter to such a composition.

Example 10

Composition for Replacement of Partially Skimmed 1% Milk in 65% of the Volume

A composition is formulated to contain (% wt/wt) 79% skim milk (containing 0.1% wt/wt butter fat), 15% half-and-half cream (containing 10% wt/wt butter fat), 5.7% wt/wt serum solids, and 0.3% wt/wt stabilizer. In this way, the reduced-volume partially skimmed 1% milk replacement composition has the whitening effect of commercial 1% milk in a target volume of 65% of the volume of the partially skimmed 1% milk to be replaced.

This reduced-volume partially skimmed 1% milk replacement composition comprises about 1.5% wt/wt butter fat (compared with conventional partially skimmed milk containing 1%) and 14.9% (wt/wt) serum solids. Specifically: 5.7 g serum solids/100 g of composition is contributed by direct addition of serum solids, 7.9 g serum solids/100 g of composition is contributed by the skim milk component, and 1.35 g serum solids/100 g of composition is contributed by the cream component. Thus, the target volume for this reduced-volume partially skimmed 1% milk replacement composition is 65%.

To formulate 100 g of this composition the following ingredients may be combined: 79 g skim milk, 15 g half-and-half cream, 5.7 g of serum solids (skim milk powder), and 0.3 g of stabilizer. The resulting compositional analysis, based on the values shown above in Table 1 is a composition having the values shown in Table 10-A.

TABLE 10-A

Analysis of Initial Ingredients in Example 10 Composition

|  | Water (g) | Butter fat (g) | Serum solids (g) | Stabilizer (g) | Total |
|---|---|---|---|---|---|
| Skim Milk | 72.364 | 0 | 6.636 | 0 | 79 |
| Half-and-half | 12.51 | 1.5 | 0.975 | 0.015 | 15 |
| Powdered Skim Milk | 0.0285 | 0 | 5.6715 | 0 | 5.7 |
| Stabilizer | 0 | 0 | 0 | 0.3 | 0.3 |
| Totals | 84.9025 | 1.5 | 13.2825 | 0.315 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 5.3 g of skim milk powder, 86 g of milk, 8.4 g coffee cream, and 0.3 g stabilizer. When the compositional analysis of these ingredients is considered in view of the values provided in Table 1, a nearly identical compositional analysis results, as exhibited in Table 10-B.

TABLE 10-B

Analysis of Alternative Ingredients for Example 10

| | Water (g) | Butter fat (g) | Serum solids (g) | Stabilizer (g) | Total |
|---|---|---|---|---|---|
| Powdered Skim Milk | 0.0265 | 0 | 5.2735 | 0 | 5.3 |
| Skim Milk | 78.776 | 0 | 7.224 | 0 | 86 |
| Coffee Cream | 6.384 | 1.512 | 0.4872 | 0.0168 | 8.4 |
| Stabilizer | 0 | 0 | 0 | 0.3 | 0.3 |
| Totals | 85.1865 | 1.512 | 12.9847 | 0.3168 | 100 |

When comparison is made between the ingredients of Table 10-A and Table 10-B, it is clear to see that the same composition may be prepared using different ingredients as long as it is formulated to have the same nutrient content once mixed.

Example 11

Composition for Replacement of Partially Skimmed 1% Milk in 55% of the Volume

A composition is formulated to contain (% wt/wt) 75% skim milk (containing 0.1% wt/wt butter fat), 17.7% half-and-half cream (containing 10% wt/wt butter fat), 7% wt/wt serum solids, and 0.3% wt/wt stabilizer. In this way, the reduced-volume partially skimmed 1% milk replacement composition has the whitening effect of commercial 1% milk in a target volume of 55% of the volume of the partially skimmed 1% milk to be replaced.

This reduced-volume partially skimmed 1% milk replacement composition comprises about 1.8% wt/wt butter fat (compared with conventional partially skimmed milk containing 1%) and 16% (wt/wt) serum solids. Specifically: 7 g serum solids/100 g of composition is contributed by direct addition of serum solids, 7.4 g serum solids/100 g of composition is contributed by the skim milk component, and 1.6 g serum solids/100 g of composition is contributed by the cream component. Thus, the target volume for this reduced-volume partially skimmed 1% milk replacement composition is 55%.

To formulate 100 g of this composition the following ingredients may be combined: 57 g skim milk, 17.7 g half-and-half cream, 7 g of serum solids (skim milk powder), and 0.3 g of stabilizer. The resulting compositional analysis, based on the values shown above in Table 1 is a composition having the values shown in Table11-A.

TABLE 11-A

Analysis of Initial Ingredients in Example 11 Composition

| | Water (g) | Butter fat (g) | Serum solids (g) | Stabilizer (g) | Total |
|---|---|---|---|---|---|
| Skim Milk | 68.7 | 0 | 6.3 | 0 | 75 |
| Half-and-half | 14.7618 | 1.77 | 1.1505 | 0.0177 | 17.7 |
| Powdered Skim Milk | 0.035 | 0 | 6.965 | 0 | 7 |
| Stabilizer | 0 | 0 | 0 | 0.3 | 0.3 |
| Totals | 83.4968 | 1.77 | 14.4155 | 0.3177 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 14.7 g of skim milk powder, 83 g water, 2 g butter and 0.3 g stabilizer. When the compositional analysis of these ingredients is considered in view of the values provided in Table 1, a nearly identical compositional analysis results, as exhibited in Table 11-B.

TABLE 11-B

Analysis of Alternative Ingredients for Example 11

| | Water (g) | Butter fat (g) | Serum solids (g) | Stabilizer (g) | Total |
|---|---|---|---|---|---|
| Powdered Skim Milk | 0.0735 | 0 | 14.6265 | 0 | 14.7 |
| Water | 83 | 0 | 0 | 0 | 83 |
| Butter | 0.266 | 1.72 | 0.014 | 0 | 2 |
| Stabilizer | 0 | 0 | 0 | 0.3 | 0.3 |
| Totals | 83.3395 | 1.72 | 14.6405 | 0.3 | 100 |

When comparison is made between the ingredients of Table 11-A and Table 11-B, it is clear to see that the same composition may be prepared using different ingredients as long as it is formulated to have the same nutrient content once mixed. Notably, the composition outlined with the alternative ingredients in Table 11-B shows that a milk replacement formulation need not contain fluid milk at all, provided the serum solids, and fat content matches the designated parameters. In this case, the composition consists of powdered skim milk, water, butter, and a stabilizer.

Example 12

Composition for Replacement of Partially Skimmed 1.5% Milk in 77% of the Volume

While 1.5% butter fat content is not a conventional milk formulation, this example is provided to illustrate how a butter fat content intermediate between the conventional partially skimmed milk values of 1% and 2% milk can be determined as the content of the selected milk to be replaced. A composition is formulated to contain (% wt/wt) 84% partially skimmed milk (containing 1% wt/wt butter fat), 11.7% half-and-half cream (containing 10% wt/wt butter fat), 4% wt/wt serum solids, and 0.3% wt/wt stabilizer. In this way, the reduced-volume partially skimmed 1.5% milk replacement composition has the whitening effect of 1.5% milk in a target volume of 77% of the volume of the partially skimmed 1.5% milk to be replaced.

This reduced-volume partially skimmed 1.5% milk replacement composition comprises about 2% wt/wt butter fat (compared with the selected partially skimmed milk to be replaced containing 1.5%) and 13% (wt/wt) serum solids. Specifically: 4 g serum solids/100 g of composition is contributed by direct addition of serum solids, 8.3 g serum solids/100 g of composition is contributed by the 1% milk component, and 1 g serum solids/100 g of composition is contributed by the cream component. Thus, the target volume for this reduced-volume partially skimmed 1% milk replacement composition is 77%.

To formulate 100 g of this composition the following ingredients may be combined: 84 g of partially skimmed (1% b.f.) milk, 11.7 g of half-and-half cream, 4 g of serum solids (skim milk powder), and 0.3 g of stabilizer. The resulting compositional analysis, based on the values shown above in Table 1 is a composition having the values shown in Table 12-A.

TABLE 12-A

Analysis of Initial Ingredients in Example 12 Composition

|  | Water (g) | Butter fat (g) | Serum solids (g) | Stabilizer (g) | Total |
|---|---|---|---|---|---|
| 1% Milk | 76.944 | 0 | 7.056 | 0 | 84 |
| Half-and-half | 9.7578 | 1.17 | 0.7605 | 0.0117 | 11.7 |
| Powdered Skim Milk | 0.02 | 0 | 3.98 | 0 | 4 |
| Stabilizer | 0 | 0 | 0 | 0.3 | 0.3 |
| Totals | 86.7218 | 1.17 | 11.7965 | 0.3117 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 4 g of soy-based non-fat serum solids (dry), 89.1 g of skim milk, 6.6 g coffee cream, and 0.3 g stabilizer. When the compositional analysis of these ingredients is considered in view of the values provided in Table 1, a nearly identical compositional analysis results, as exhibited in Table 12-B.

TABLE 12-B

Analysis of Alternative Ingredients for Example 12

|  | Water (g) | Butter fat (g) | Serum solids (g) | Stabilizer (g) | Total |
|---|---|---|---|---|---|
| Soy-based non-fat serum solids | 0.02 | 0 | 3.98 | 0 | 4 |
| Skim Milk | 81.6156 | 0 | 7.4844 | 0 | 89.1 |
| Coffee Cream | 5.016 | 1.188 | 0.3828 | 0.0132 | 6.6 |
| Stabilizer | 0 | 0 | 0 | 0.3 | 0.3 |
| Totals | 86.6516 | 1.188 | 11.8472 | 0.3132 | 100 |

When comparison is made between the ingredients of Table 12-A and Table 12-B, it is clear to see that the same composition may be prepared using different ingredients as long as it is formulated to have the same nutrient content once mixed.

Example 13

Composition for Replacement of Partially Skimmed 1% Milk in 80% of the Volume

A composition is formulated to contain (% wt/wt) 90% partially skimmed milk (containing % wt/wt butter fat), 7.8% light cream (containing 5% wt/wt butter fat), 2% wt/wt serum solids, and 0.2% wt/wt stabilizer. In this way, the reduced-volume partially skimmed 1% milk replacement composition has the whitening effect of commercial 1% milk in a target volume of 80% of the volume of the partially skimmed 1% milk to be replaced.

This reduced-volume partially skimmed 1% milk replacement composition comprises about 1.3% wt/wt butter fat (compared with conventional partially skimmed milk containing 1%) and 11.6% (wt/wt) serum solids. Specifically: 2 g serum solids/100 g of composition is contributed by direct addition of serum solids, 8.9 g serum solids/100 g of composition is contributed by the partially skimmed 1% milk component, and 0.74 g serum solids/100 g of composition is contributed by the cream component. Thus, the target volume for this reduced-volume partially skimmed 1% milk replacement composition is 80%.

To formulate 100 g of this composition the following ingredients may be combined: 90 g of partially skimmed (1% b.f.) milk; 7.8 g of light cream (5% b.f.); 2 g skim milk powder; and 0.2 g stabilizer. The resulting compositional analysis, based on the values shown above in Table 1 is a composition having the values shown in Table 13-A.

TABLE 13-A

Analysis of Initial Ingredients in Example 13 Composition

|  | Water (g) | Butter fat (g) | Serum solids (g) | Stabilizer (g) | Total |
|---|---|---|---|---|---|
| 1% Milk | 81.63 | 0.9 | 7.47 | 0 | 90 |
| Half-and-half | 6.5052 | 0.78 | 0.507 | 0.0078 | 7.8 |
| Powdered Skim Milk | 0.01 | 0 | 1.99 | 0 | 2 |
| Stabilizer | 0 | 0 | 0 | 0.2 | 0.2 |
| Totals | 88.1452 | 1.68 | 9.967 | 0.2078 | 100 |

Once the ingredients of this composition are combined together, the origin of each ingredient is indistinguishable. That is to say, the water content could have been derived from either fluid milk, cream or even from water itself, but it cannot be resolved once mixing has taken place. Thus, this same composition may be formed from other ingredients to achieve the same outcome in terms of compositional analysis of water, butter fat, serum solids and stabilizer totals. An exemplary alternative composition is, for example: 2 g powdered skim milk, 14 g skim milk, and 84 g of partially skimmed (2% b.f.) milk. The stabilizer may be omitted in this recipe, in part because the butter fat content is fairly low compared, for example, with a cream replacement.

When the compositional analysis of these ingredients is considered in view of the values provided in Table 1, a nearly identical compositional analysis results, as exhibited in Table 13-B.

TABLE 13-B

Analysis of Alternative Ingredients for Example 13

|  | Water (g) | Butter fat (g) | Serum solids (g) | Stabilizer (g) | Total |
|---|---|---|---|---|---|
| Powdered Skim Milk | 0.01 | 0 | 1.99 | 0 | 2 |
| Skim Milk | 12.824 | 0 | 1.176 | 0 | 14 |
| 2% Milk | 75.432 | 1.68 | 6.888 | 0 | 84 |
| Totals | 88.266 | 1.68 | 10.054 | 0 | 100 |

When comparison is made between the ingredients of Table 13-A and Table 13-B, it is clear to see that the same composition may be prepared using different ingredients as long as it is formulated to have the same nutrient content once mixed. The composition of Table 13-B consists of three ingredients: skim milk powder, skim milk, and partially skimmed milk, and serves the same purpose as the composition on Table 13-A, but with a different recipe of ingredients, which that results in an indistinguishable end-result.

Example 14

Composition for Replacement of Skim Milk in 85% of the Volume

A composition is formulated to contain (% wt/wt): 97.3% skim milk (containing 0.1% wt/wt butter fat), 0.4% cream (containing 5% wt/wt butter fat), 2% wt/wt serum solids, and 0.3% wt/wt stabilizer. In this way, the reduced-volume skim milk replacement composition has the whitening effect of commercial skim milk in a target volume of 85% of the volume of the skim milk to be replaced.

This reduced-volume skim milk replacement composition comprises about 0.117% wt/wt butter fat (compared with conventional skim milk containing 0.1%) and 11.8% (wt/wt) serum solids. Specifically: 2 g serum solids/100 g of composition is contributed by direct addition of serum solids, 9.7 g serum solids/100 g of composition is contributed by the skim milk component, and 0.04 g serum solids/100 g of composition is contributed by the cream component. Thus, the target volume for this reduced-volume skim milk replacement composition is 85%.

To formulate 100 g of this composition the following ingredients may be combined: 97.3 g skim milk, 0.4 g light cream, 2 g of serum solids (skim milk powder), and 0.3 g of stabilizer. The resulting compositional analysis, based on the values shown above in Table 1 is a composition having the values shown in Table 14-A.

TABLE 14-A

Analysis of Initial Ingredients in Example 14 Composition

|  | Water (g) | Butter fat (g) | Serum solids (g) | Stabilizer (g) | Total |
|---|---|---|---|---|---|
| Skim Milk | 89.1268 | 0 | 8.1732 | 0 | 97.3 |
| Light Cream | 0.3336 | 0.04 | 0.026 | 0.0004 | 0.4 |
| Powdered Skim Milk | 0.01 | 0 | 1.99 | 0 | 2 |
| Stabilizer | 0 | 0 | 0 | 0.3 | 0.3 |
| Totals | 89.4704 | 0.04 | 10.1892 | 0.3004 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 2 g of skim milk powder, 95.8 g of skim milk, 2 g of 2% milk, and 0.2 g stabilizer. When the compositional analysis of these ingredients is considered in view of the values provided in Table 1, a nearly identical compositional analysis results, as exhibited in Table 14-B.

TABLE 14-B

Analysis of Alternative Ingredients for Example 14

|  | Water (g) | Butter fat (g) | Serum solids (g) | Stabilizer (g) | Total |
|---|---|---|---|---|---|
| Powdered Skim Milk | 0.01 | 0 | 1.99 | 0 | 2 |
| Skim Milk | 87.7528 | 0 | 8.0472 | 0 | 95.8 |
| 2% Milk | 1.796 | 0.04 | 0.164 | 0 | 2 |
| Stabilizer | 0 | 0 | 0 | 0.2 | 0.2 |
| Totals | 89.5588 | 0.04 | 10.2012 | 0.2 | 100 |

When comparison is made between the ingredients of Table 14-A and Table 14-B, it is clear to see that the same composition may be prepared using different ingredients as long as it is formulated to have the same nutrient content once mixed.

Example 15

Composition for Replacement of Skim Milk in 80% of the Volume

A composition is formulated to contain (% wt/wt): 96.6% skim milk (containing 0.1% wt/wt butter fat), 0.6% cream (containing 5% wt/wt butter fat), 2.5% wt/wt serum solids, and 0.3% wt/wt stabilizer. In this way, the reduced-volume skim milk replacement composition has the whitening effect of commercial skim milk in a target volume of 80% of the volume of the skim milk to be replaced.

This reduced-volume skim milk replacement composition comprises about 0.127% wt/wt butter fat (compared with conventional skim milk containing 0.1%) and 12.2% (wt/wt) serum solids. Specifically: 2.5 g serum solids/100 g of composition is contributed by direct addition of serum solids, 9.6 g serum solids/100 g of composition is contributed by the skim milk component, and 0.06 g serum solids/100 g of composition is contributed by the cream component. Thus, the target volume for this reduced-volume skim milk replacement composition is 80%.

To formulate 100 g of this composition the following ingredients may be combined: 96.6 g of skim milk, 0.6 g of light cream, 2.5 g of serum solids (skim milk powder), and 0.3 g of stabilizer. The resulting compositional analysis, based on the values shown above in Table 1 is a composition having the values shown in Table 15-A.

TABLE 15-A

Analysis of Initial Ingredients in Example 15 Composition

| | Water (g) | Butter fat (g) | Serum solids (g) | Stabilizer (g) | Total |
|---|---|---|---|---|---|
| Skim Milk | 88.4856 | 0 | 8.1144 | 0 | 96.6 |
| Light Cream | 0.5004 | 0.06 | 0.039 | 0.0006 | 0.6 |
| Powdered Skim Milk | 0.0125 | 0 | 2.4875 | 0 | 2.5 |
| Stabilizer | 0 | 0 | 0 | 0.3 | 0.3 |
| Totals | 88.9985 | 0.06 | 10.6409 | 0.3006 | 100 |

Once the ingredients of this composition are combined together, the origin of each ingredient is indistinguishable. That is to say, the water content could have been derived from either fluid milk, cream or even from water itself, but it cannot be resolved once mixing has taken place. Thus, this same composition may be formed from other ingredients to achieve the same outcome in terms of compositional analysis of water, butter fat, serum solids and stabilizer totals. An exemplary alternative composition is, for example: 10 g skim milk powder, 83.8 g water, 6 g of partially skimmed (1% b.f.) milk, and 0.2 g stabilizer. When the compositional analysis of these ingredients is considered in view of the values provided in Table 1, a nearly identical compositional analysis results, as exhibited in Table 15-B.

TABLE 15-B

Analysis of Alternative Ingredients for Example 15

| | Water (g) | Butter fat (g) | Serum solids (g) | Stabilizer (g) | Total |
|---|---|---|---|---|---|
| Powdered Skim Milk | 0.05 | 0 | 9.95 | 0 | 10 |
| Water | 83.8 | 0 | 0 | 0 | 83.8 |
| 1% Milk | 5.442 | 0.06 | 0.498 | 0 | 6 |
| Stabilizer | 0 | 0 | 0 | 0.2 | 0.2 |
| Totals | 89.292 | 0.06 | 10.448 | 0.2 | 100 |

When comparison is made between the ingredients of Table 15-A and Table 15-B, it is clear to see that the same composition may be prepared using different ingredients as long as it is formulated to have the same nutrient content once mixed.

Example 16

Composition for Replacement of Skim Milk in 67% of the Volume

This composition is a reduced-volume skim milk replacement composition. The composition comprises 94% skim milk (containing 0.1% wt/wt butter fat), 1% cream (containing 5% wt/wt butter fat), 4.7% wt/wt serum solids, and 0.3% wt/wt stabilizer. In this way, the reduced-volume skim milk replacement composition has the whitening effect of commercial skim milk in a target volume that is about ⅔ (67%) of the volume of the skim milk to be replaced.

This reduced-volume skim milk replacement composition comprises about 0.15% wt/wt butter fat (compared with conventional skim milk containing 0.1%) and 14% (wt/wt) serum solids. Specifically: 4.7 g serum solids/100 g of composition is contributed by direct addition of serum solids, 9.4 g serum solids/100 g of composition is contributed by the skim milk component, and 0.1 g serum solids/ 100 g of composition is contributed by the cream component. These values are based on skim milk comprising about 10% serum solids while cream containing 5% butter fat comprises about 9.5% serum solids. Thus, the target volume for this reduced-volume skim milk replacement composition is about 67%.

To formulate 100 g of this composition the following ingredients may be combined: 94 g skim milk; 1 g light cream (5% b.f.), 4.7 g of serum solids (skim milk powder), and 0.3 g of stabilizer. The resulting compositional analysis, based on the values shown above in Table 1 is a composition having the values shown in Table 16-A.

TABLE 16-A

Analysis of Initial Ingredients in Example 16 Composition

| | Water (g) | Butter fat (g) | Serum solids (g) | Stabilizer (g) | Total |
|---|---|---|---|---|---|
| Skim Milk | 86.104 | 0 | 7.896 | 0 | 94 |
| Light Cream | 0.834 | 0.1 | 0.065 | 0.001 | 1 |
| Powdered Skim Milk | 0.0235 | 0 | 4.6765 | 0 | 4.7 |
| Stabilizer | 0 | 0 | 0 | 0.3 | 0.3 |
| Totals | 86.9615 | 0.1 | 12.6375 | 0.301 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 12 g of skim milk powder, 11 g of 1% milk, 77 g water, and 0.2 g stabilizer. When the compositional analysis of these ingredients is considered in view of the values provided in Table 1, a nearly identical compositional analysis results, as exhibited in Table 16-B.

TABLE 16-B

Analysis of Alternative Ingredients for Example 16

| | Water (g) | Butter fat (g) | Serum solids (g) | Stabilizer (g) | Total |
|---|---|---|---|---|---|
| Powdered Skim Milk | 0.06 | 0 | 11.94 | 0 | 12 |
| Water | 77 | 0 | 0 | 0 | 77 |
| 1% Milk | 9.977 | 0.11 | 0.913 | 0 | 11 |
| Stabilizer | 0 | 0 | 0 | 0.2 | 0.2 |
| Totals | 87.037 | 0.11 | 12.853 | 0.2 | 100.2 |

When comparison is made between the ingredients of Table 16-A and Table 16-B, it is clear to see that the same composition may be prepared using different ingredients as long as it is formulated to have the same nutrient content once mixed.

Example 17

Composition for Replacement of Skim Milk in 75% of the Volume

A composition is formulated to contain (% wt/wt): 95.4% skim milk (containing 0.1% wt/wt butter fat), 0.8% cream (containing 5% wt/wt butter fat), 3.5% wt/wt serum solids, and 0.3% wt/wt stabilizer. In this way, the reduced-volume skim milk replacement composition has the whitening effect of commercial skim milk in a target volume of 75% of the volume of the skim milk to be replaced.

This reduced-volume skim milk replacement composition comprises about 0.135% wt/wt butter fat (compared with conventional skim milk containing 0.1%) and 13.1% (wt/wt) serum solids. Specifically: 3.5 g serum solids/100 g of composition is contributed by direct addition of serum solids, 9.5 g serum solids/100 g of composition is contributed by the skim milk component, and 0.08 g serum solids/100 g of composition is contributed by the cream component. Thus, the target volume for this reduced-volume skim milk replacement composition is 75%.

To formulate 100 g of this composition the following ingredients may be combined: 95.4 g skim milk, 0.8 g light cream, 0.3 g of serum solids (skim milk powder), and 0.3 g of stabilizer. The resulting compositional analysis, based on the values shown above in Table 1 is a composition having the values shown in Table 17-A.

TABLE 17-A

Analysis of Initial Ingredients in Example 17 Composition

|  | Water (g) | Butter fat (g) | Serum solids (g) | Stabilizer (g) | Total |
|---|---|---|---|---|---|
| Skim Milk | 87.3864 | 0 | 8.0136 | 0 | 95.4 |
| Light Cream | 0.6672 | 0.08 | 0.052 | 0.0008 | 0.8 |
| Powdered Skim Milk | 0.0175 | 0 | 3.4825 | 0 | 3.5 |
| Stabilizer | 0 | 0 | 0 | 0.3 | 0.3 |
| Totals | 88.0711 | 0.08 | 11.5481 | 0.3008 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 3.4 g of skim milk powder, 8 g of 1% milk, 88.4 g skim milk, and 0.2 g stabilizer. When the compositional analysis of these ingredients is considered in view of the values provided in Table 1, a nearly identical compositional analysis results, as exhibited in Table 17-B.

TABLE 17-B

Analysis of Alternative Ingredients for Example 17

|  | Water (g) | Butter fat (g) | Serum solids (g) | Stabilizer (g) | Total |
|---|---|---|---|---|---|
| Powdered Skim Milk | 0.017 | 0 | 3.383 | 0 | 3.4 |
| Skim Milk | 80.9744 | 0 | 7.4256 | 0 | 88.4 |
| 1% Milk | 7.256 | 0.08 | 0.664 | 0 | 8 |
| Stabilizer | 0 | 0 | 0 | 0.2 | 0.2 |
| Totals | 88.2474 | 0.08 | 11.4726 | 0.2 | 100 |

When comparison is made between the ingredients of Table 17-A and Table 17-B, it is clear to see that the same composition may be prepared using different ingredients as long as it is formulated to have the same nutrient content once mixed.

Example 18

Composition for Replacement of Skim Milk in 60% of the Volume

A composition is formulated to contain (% wt/wt): 91.3% skim milk (containing 0.1% wt/wt butter fat), 1.5% cream (containing 5% wt/wt butter fat), 6.9% wt/wt serum solids, and 0.3% wt/wt stabilizer. In this way, the reduced-volume skim milk replacement composition has the whitening effect of commercial skim milk in a target volume of 60% of the volume of the skim milk to be replaced.

This reduced-volume skim milk replacement composition comprises about 0.166% wt/wt butter fat (compared with conventional skim milk containing 0.1%) and 16% (wt/wt) serum solids. Specifically: 6.9 g serum solids/100 g of composition is contributed by direct addition of serum solids, 9.1 g serum solids/100 g of composition is contributed by the skim milk component, and 0.14 g serum solids/100 g of composition is contributed by the cream component. Thus, the target volume for this reduced-volume skim milk replacement composition is 60%.

To formulate 100 g of this composition the following ingredients may be combined: 91.3 g skim milk, 1.5 g light cream, 6.9 g of serum solids (skim milk powder), and 0.3 g of stabilizer. The resulting compositional analysis, based on the values shown above in Table 1 is a composition having the values shown in Table 18-A.

TABLE 18-A

Analysis of Initial Ingredients in Example 18 Composition

| Component | Nutrient | | | | |
|---|---|---|---|---|---|
|  | Water (g) | Butter fat (g) | Serum solids (g) | Stabilizer (g) | Total |
| Skim Milk | 83.6308 | 0 | 7.6692 | 0 | 91.3 |
| Light Cream | 1.251 | 0.15 | 0.0975 | 0.0015 | 1.5 |
| Powdered Skim Milk | 0.0345 | 0 | 6.8655 | 0 | 6.9 |
| Stabilizer | 0 | 0 | 0 | 0.3 | 0.3 |
| Totals | 84.9163 | 0.15 | 14.6322 | 0.3015 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 7 g of skim milk powder, 16 g of 1% milk, 76.8 g skim milk, and 0.2 g stabilizer. When the compositional analysis of these ingredients is considered in view of the values provided in Table 1, a nearly identical compositional analysis results, as exhibited in Table 18-B.

TABLE 18-B

Analysis of Alternative Ingredients for Example 18

| Ingredient | Nutrient | | | | |
| --- | --- | --- | --- | --- | --- |
| | Water (g) | Butter fat (g) | Serum solids (g) | Stabilizer (g) | Total |
| Powdered Skim Milk | 0.035 | 0 | 6.965 | 0 | 7 |
| Skim Milk | 70.3488 | 0 | 6.4512 | 0 | 76.8 |
| 1% Milk | 14.512 | 0.16 | 1.328 | 0 | 16 |
| Stabilizer | 0 | 0 | 0 | 0.2 | 0.2 |
| Totals | 84.8958 | 0.16 | 14.7442 | 0.2 | 100 |

When comparison is made between the ingredients of Table 18-A and Table 18-B, it is clear to see that the same composition may be prepared using different ingredients as long as it is formulated to have the same or similar nutrient content once mixed.

Example 19

Composition for Replacement of Skim Milk in 55% of the Volume

A composition is formulated to contain (% wt/wt): 88.7% skim milk (containing 0.1% wt/wt butter fat), 2% cream (containing 5% wt/wt butter fat), 9.0% wt/wt serum solids, and 0.3% wt/wt stabilizer. In this way, the reduced-volume skim milk replacement composition has the whitening effect of commercial skim milk in a target volume of 55% of the volume of the skim milk to be replaced.

This reduced-volume skim milk replacement composition comprises about 0.189% wt/wt butter fat (compared with conventional skim milk containing 0.1%) and 18% (wt/wt) serum solids. Specifically: 9 g serum solids/100 g of composition is contributed by direct addition of serum solids, 8.9 g serum solids/100 g of composition is contributed by the skim milk component, and 0.19 g serum solids/100 g of composition is contributed by the cream component. Thus, the target volume for this reduced-volume skim milk replacement composition is 55%.

To formulate 100 g of this composition the following ingredients may be combined: 88.7 g skim milk, 2 g light cream, 9 g of serum solids (skim milk powder), and 0.3 g of stabilizer. The resulting compositional analysis, based on the values shown above in Table 1 is a composition having the values shown in Table 19-A.

TABLE 19-A

Analysis of Initial Ingredients in Example 19 Composition

| Component | Nutrient | | | | |
| --- | --- | --- | --- | --- | --- |
| | Water (g) | Butter fat (g) | Serum solids (g) | Stabilizer (g) | Total |
| Skim Milk | 81.2492 | 0 | 7.4508 | 0 | 88.7 |
| Light Cream | 1.668 | 0.2 | 0.13 | 0.002 | 2 |
| Powdered Skim Milk | 0.045 | 0 | 8.955 | 0 | 9 |
| Stabilizer | 0 | 0 | 0 | 0.3 | 0.3 |
| Totals | 82.9622 | 0.2 | 16.5358 | 0.302 | 100 |

Once the four ingredients of this composition are combined together, the origin of each ingredient is indistinguishable. That is to say, the butter fat content could have been derived from cream, milk or even butter itself, but it cannot be resolved once mixing has taken place. Further, the total serum solids content of the composition (from all sources) cannot be traced back to individual components once the composition is formed. Thus, this composition may be formed from other ingredients to achieve the same outcome in terms of overall nutrient content of the composition. An exemplary alternative composition is, for example: 16 g of skim milk powder, 10 g of 2% milk, 73.8 g water, and 0.2 g stabilizer. When the compositional analysis of these ingredients is considered in view of the values provided in Table 1, a nearly identical compositional analysis results, as exhibited in Table 19-B.

TABLE 19-B

Analysis of Alternative Ingredients for Example 19

| | Water (g) | Butter fat (g) | Serum solids (g) | Stabilizer (g) | Total |
| --- | --- | --- | --- | --- | --- |
| Powdered Skim Milk | 0.08 | 0 | 15.92 | 0 | 16 |
| Water | 73.8 | 0 | 0 | 0 | 73.8 |
| 2% Milk | 8.98 | 0.2 | 0.82 | 0 | 10 |
| Stabilizer | 0 | 0 | 0 | 0.2 | 0.2 |
| Totals | 82.86 | 0.2 | 16.74 | 0.2 | 100 |

When comparison is made between the ingredients of Table 19-A and Table 19-B, it is clear to see that the same composition may be prepared using different ingredients as long as it is formulated to have the same or very similar overall nutrient content once mixed.

Example 20

Composition for Replacement of Half-and-Half (10% bf) Cream in 75% of the Volume A composition is formulated to contain (% wt/wt): 59% skim milk (containing 0.1% wt/wt butter fat), 37.8% "whipping" cream (containing 35% wt/wt butter fat), 3.0% wt/wt serum solids, and 0.2% wt/wt stabilizer. In this way, the reduced-volume half-and-half cream replacement composition has the whitening effect of commercial half-and-half cream in a target volume of 75% of the volume of the half-and-half cream to be replaced.

This reduced-volume half-and-half cream replacement composition comprises about 13.3% wt/wt butter fat (compared with conventional half-and-half cream containing 10%) and 11.3% (wt/wt) serum solids. Specifically: 3 g serum solids/100 g of composition is contributed by direct addition of serum solids, 5.8 g serum solids/100 g of composition is contributed by the skim milk component, and 2.4 g serum solids/100 g of composition is contributed by the cream component. Thus, the target volume for this reduced-volume half-and-half cream replacement composition is 75%.

To formulate 100 g of this composition the following ingredients may be combined: 59 g skim milk, 37.8 g heavy cream, 3 g powdered milk protein isolate, and 0.2 g stabilizer. The resulting compositional analysis, based on the values shown above in Table 1 is a composition having the values shown in Table 20-A.

TABLE 20-A

Analysis of Initial Ingredients in Example 20 Composition

| Component | Nutrient | | | | |
|---|---|---|---|---|---|
| | Water (g) | Butter fat (g) | Serum solids (g) | Stabilizer (g) | Total |
| Skim Milk | 54.044 | 0 | 4.956 | 0 | 59 |
| Heavy Cream | 22.4154 | 13.23 | 2.079 | 0.0756 | 37.8 |
| Powdered Milk Protein Isolate | 0.015 | 0 | 2.985 | 0 | 3 |
| Stabilizer | 0 | 0 | 0 | 0.2 | 0.2 |
| Totals | 76.4744 | 13.23 | 10.02 | 0.2756 | 100 |

Once the ingredients of this composition are combined together, the origin of each ingredient is indistinguishable. That is to say, the water content could have been derived from either fluid milk, cream or even from water itself, but it cannot be resolved once mixing has taken place. Thus, this same composition may be formed from other ingredients to achieve the same outcome in terms of compositional analysis of water, butter fat, serum solids and stabilizer totals. An exemplary alternative composition is, for example: 10 g powdered milk protein isolate, 74.3 g water, 15.5 g butter, and 0.2 g stabilizer. When the compositional analysis of these ingredients is considered in view of the values provided in Table 1, a nearly identical compositional analysis results, as exhibited in Table 20-B.

TABLE 20-B

Analysis of Alternative Ingredients for Example 20

| Component | Nutrient | | | | |
|---|---|---|---|---|---|
| | Water (g) | Butter fat (g) | Serum solids (g) | Stabilizer (g) | Total |
| Powdered Milk Protein Isolate | 0.05 | 0 | 9.95 | 0 | 10 |
| Water | 74.3 | 0 | 0 | 0 | 74.3 |
| Butter | 2.0615 | 13.33 | 0.1085 | 0 | 15.5 |
| Stabilizer | 0 | 0 | 0 | 0.2 | 0.2 |
| Totals | 76.4115 | 13.33 | 10.0585 | 0.2 | 100 |

When comparison is made between the ingredients of Table 20-A and Table 20-B, it is clear to see that the same composition may be prepared using different ingredients as long as it is formulated to have the same nutrient content once mixed.

Example 21

Composition for Replacement of Light Cream in 60% of the Volume

A composition is formulated to contain (% wt/wt): 56% partially skimmed milk (containing 2% wt/wt butter fat), 39.7% coffee cream (containing 18% wt/wt butter fat), 4% wt/wt serum solids, and 0.3% wt/wt stabilizer. In this way, the reduced-volume light cream replacement composition has the whitening effect of commercial light cream in a target volume of 60% of the volume of the light cream to be replaced.

This reduced-volume light cream replacement composition comprises about 8.3% wt/wt butter fat (compared with conventional light cream containing 5%) and 12% (wt/wt) serum solids. Specifically: 4 g serum solids/100 g of composition is contributed by direct addition of serum solids, 8.9 g serum solids/100 g of composition is contributed by the milk component, and 3.2 g serum solids/100 g of composition is contributed by the cream component. Thus, the target volume for this reduced-volume light cream replacement composition is 60%.

To formulate 100 g of this composition the following ingredients may be combined: 4 g skim milk powder, 39.7 g coffee cream, 56 g of 2% milk and 0.3 g stabilizer. The resulting compositional analysis, based on the values shown above in Table 1 is a composition having the nutrient values shown in Table 21-A.

TABLE 21-A

Analysis of Initial Ingredients in Example 21 Composition

| Component | Nutrient | | | | |
|---|---|---|---|---|---|
| | Water (g) | Butter fat (g) | Serum solids (g) | Stabilizer (g) | Total |
| 2% Milk | 50.288 | 1.12 | 4.592 | 0 | 56 |
| Coffee Cream | 30.172 | 7.146 | 2.3026 | 0.0794 | 39.7 |
| Powdered Skim Milk | 0.02 | 0 | 3.98 | 0 | 4 |
| Stabilizer | 0 | 0 | 0 | 0.3 | 0.3 |
| Totals | 80.48 | 8.266 | 10.8746 | 0.3794 | 100 |

Once the ingredients of this composition are combined together, the origin of each ingredient is indistinguishable. That is to say, the water content could have been derived from either fluid milk, cream or even from water itself, but it cannot be resolved once mixing has taken place. Thus, this same composition may be formed from other ingredients to achieve the same outcome in terms of compositional analysis of water, butter fat, serum solids and stabilizer totals. An exemplary alternative composition is, for example: 4 g of skim milk powder, 69 g light cream and 27 g coffee cream. In this example, no additional stabilizer is used, but it is noted that the two different creams used to supply the water content and the fat content of the composition may already contain stabilizer, and thus it is present as a "nutrient" in the composition, even though it is not added as a separate component according to Table 21-B. When the compositional analysis of these ingredients is considered in view of the values provided in Table 1, a nearly identical nutrient analysis results, as exhibited in Table 21-B.

TABLE 21-B

Nutrient Analysis of Alternative Ingredients for Example 21

| | Water (g) | Butter fat (g) | Serum solids (g) | Stabilizer (g) | Total |
|---|---|---|---|---|---|
| Powdered Skim Milk | 0.02 | 0 | 3.98 | 0 | 4 |
| Light cream | 60.375 | 3.45 | 5.106 | 0.069 | 69 |
| Coffee Cream | 20.52 | 4.86 | 1.566 | 0.054 | 27 |
| Stabilizer | 0 | 0 | 0 | 0 | 0 |
| Totals | 80.915 | 8.31 | 10.652 | 0.123 | 100 |

When comparison is made between the ingredients of Table 21-A and Table 21-B, it is clear to see that the same composition may be prepared using different ingredients as long as it is formulated to have the same nutrient content once mixed.

Example 22

Composition for Replacement of Skim Milk in 75% of the Volume

A composition is prepared from skim milk using reverse osmosis. Skim milk is subjected to reverse osmosis to remove 25% of the weight of the original milk. The target volume (TV) in this case is 75%. This reduced-volume skim milk replacement composition has the whitening effect of commercial skim milk in a target volume of 75% of the volume of the skim milk to be replaced. Thus, if an individual would normally add 20 mL of skim milk to their coffee, they only require 75% of this volume (specifically: 15 mL) of this composition to achieve the same effect.

TABLE 22

Analysis of Nutrients in Example 22 Composition

|  | Water (g) | Butter fat (g) | Serum solids (g) | Stabilizer (g) | Total (g) |
|---|---|---|---|---|---|
| Regular Skim Milk | 91.6 (91.6%) | 0 | 8.4 (8.4%) | 0 | 100 |
| Composition for replacing Skim milk (TV of 75%) | 66.6 (88.8%) | 0 | 8.4 (11.2%) | 0 | 75 |

Example 17 also pertains to a replacement of skim milk within a target volume of 75%, and it can be seen that the described compositions do not differ significantly. A consumer would be unlikely to discern the difference between the composition prepared according to Example 22, versus the composition prepared according to Example 17 when used to whiten coffee or tea. Thus, these compositions would be considered equivalent to each other. Compositions prepared by removal of water from a dairy fluid are encompassed herein.

The above-described embodiments are intended to be examples only. Alterations, modifications and variations may be effected to the particular embodiments by those of skill in the art without departing from the scope of the invention, which is defined solely by the claims appended hereto.

The invention claimed is:

1. A beverage whitening composition for replacing a dairy fluid in a reduced amount, wherein:
   the beverage to be whitened is coffee, tea, or hot chocolate;
   the dairy fluid to be replaced is skim milk; and
   the reduced amount is a target volume (TV) of from about 60% to about 80% of the fluid to be replaced;
   said composition consisting of:
   (a) 91%-97% of a water contributor, wherein said water contributor is skim milk;
   (b) 0.5-1.5% of a milk fat contributor selected from the group consisting of butter, anhydrous milk fat, cream, and combinations thereof;
   (c) 2%-7% skim milk powder; and
   (d) a stabilizer in an amount of from about 0.2% by weight;
   wherein:
   the total butter fat content of the composition ($F_T$) is:

$$F_T = \frac{F_{FTBR} \times 100}{TV}.$$

2. The composition of claim 1 wherein the stabilizer is added in an amount of from about 0.2 to about 0.4% by weight.

3. The composition of claim 1 wherein the milk fat contributor comprises butter or anhydrous milk fat.

4. The composition of claim 1 wherein the composition consists of skim milk powder, skim milk, butter, and a stabilizer.

5. The composition of claim 1 wherein the beverage to be whitened is a hot beverage.

6. The composition of claim 1 wherein the beverage to be whitened is an iced beverage.

7. A flavored or sweetened beverage whitening composition comprising the composition of claim 1 and a flavor or sweetener.

8. A method of formulating a beverage whitening composition for replacing a selected dairy fluid in a reduced amount, wherein the beverage to be whitened is coffee, tea, or hot chocolate; and the selected dairy fluid is skim milk; said method comprising:
   determining the selected fluid to be replaced; and
   forming, in the target volume (TV) of from about 60% to about 80% of the selected dairy fluid to be replaced, the composition consisting of:
   (a) 91%-97% of a water contributor, wherein said water contributor is skim milk;
   (b) 0.5-1.5% of a milk fat contributor selected from the group consisting of butter, anhydrous milk fat, cream, and combinations thereof;
   (c) 2%-7% skim milk powder; and
   (d) a stabilizer in an amount of from about 0.2% by weight;
   wherein:
   the total butter fat content of the composition ($F_T$) is:

$$F_T = \frac{F_{FTBR} \times 100}{TV}.$$

9. The method of claim 8 wherein the water contributor comprises skim milk reconstituted from skim milk powder and water.

10. The method of claim 8 wherein the composition consists of:
    skim milk powder, skim milk, butter, and a stabilizer; or
    skim milk powder, skim milk, cream, and a stabilizer.

11. A method of whitening a beverage by replacing a selected dairy fluid to be replaced with a beverage whitening composition in a target volume (TV) of from about 60% to about 80% of the selected milk to be replaced, wherein the beverage is coffee, tea, or hot chocolate, and the dairy fluid to be replaced is skim milk; said method comprising the step of adding the beverage whitening composition to the beverage, wherein the beverage whitening composition consists of:
    (a) 91%-97% of a water contributor, wherein said water contributor is skim milk;
    (b) 0.5-1.5% of a milk fat contributor selected from the group consisting of butter, anhydrous milk fat, cream, and combinations thereof;
    (c) 2%-7% skim milk powder; and
    (d) a stabilizer in an amount of from about 0.2% by weight;

wherein:
the total butter fat content of the composition ($F_T$) is:

$$F_T = \frac{F_{FTBR} \times 100}{TV}.$$

12. A method of whitening coffee, tea, or hot chocolate, comprising adding the composition of claim 1 to the coffee, tea, or hot chocolate.

* * * * *